United States Patent Office 3,642,728
Patented Feb. 15, 1972

3,642,728
SULFONATED POLYMERS
Nathan H. Canter, Edison, N.J., assignor to Esso
Research and Engineering Company
No Drawing. Continuation-in-part of application Ser. No.
804,318, Mar. 4, 1969, which is a continuation-in-part
of application Ser. No. 765,695, Oct. 7, 1968, both now
abandoned. This application Nov. 18, 1969, Ser. No.
877,849
Int. Cl. C08f 27/06; C08d 11/02, 13/30
U.S. Cl. 260—79.3 R                    8 Claims

ABSTRACT OF THE DISCLOSURE

Polymers containing —$SO_3H$ groups and salts thereof are found to have improved physical properties. The sulfonated polymers are prepared by selective sulfonation of sites of olefinic unsaturation utilizing a sulfonating agent comprising a complex of a Lewis base with a sulfur trioxide donor. The sulfonic acid containing polymers and their sulfonate salts exhibit improved physical properties compared to the unsulfonated products.

CROSS-REFERENCE TO RELATED APPLICATIONS

This application is a continuation-in-part of U.S. application Ser. No. 804,318, filed Mar. 4, 1969, now abandoned which in turn is a continuation-in-part of U.S. application Ser. No. 765,695, filed Oct. 7, 1968, now abandoned.

BACKGROUND OF INVENTION

This invention relates to novel polymers containing sulfonic acid groups or sulfonic acid salts and the process for preparing said polymers. Hydrocarbon polymers generally fall into two broad classes, thermoplastic and thermosetting resins.

Thermoplastic resins may be readily worked by heating the polymer up to its softening point or melting point. They may then be processed by such deformation methods as vacuum forming, extrusion of a melt, compression molding, etc.

The thermoset resins can generally not be reworked once they have hardened. In general, thermoset resins owe their unique properties to covalent crosslinks between polymer molecules. The crosslinks may be introduced by interaction of various monomers such as copolymerization of styrene in the presence of smaller amounts of divinyl benzene or the reaction of epoxy type resins with polyamines.

Uncured elastomers such as natural rubber and butyl rubber are thermoplastic. They may, however, be crosslinked or vulcanized by the use of sulfur and accelerators which react with the carbon of the unsaturated bonds in the polymer molecules to form in effect a thermoset product which can no longer be fabricated or worked except by machining or otherwise. The vulcanized polymers have found wide utility because of the significant improvement in physical properties by crosslinking. Natural rubber, for example, may be crosslinked or vulcanized by the use of sulfur which reacts with the carbon of the unsaturated bonds in the polymer melecule to form a bridge between two molecules so that one polymer molecule is covalently bonded to the second molecule. If sufficient crosslinks of this type occur all molecules are joined in a single giant molecule. Once crosslinked, the polymer is intractable and can no longer be fabricated except possibly by machine. It has, however, significantly improved physical properties. Thus, by vulcanizing rubber, elasticity impact resistance, flexibility, thermo-mechanical stability and many other properties are either introduced or improved.

A third class of polymers has recently been developed which, although they are crosslinked, have a softening point or softening range of temperatures and may even be dissolved in various solvents. At normal use temperatures, these polymers behave similarly to crosslinked polymers. At elevated temperatures, however, they are readily deformed and worked in the same manner as thermoplastic resins. Such polymers are said to be physically crosslinked. An example of such materials are ionic hydrocarbon polymers (ionomers). These products owe their unique properties to the fact that crosslinking is accomplished by ionic rather than covalent bonding between molecules of the polymer. Typical of these ionic polymers are copolymers of ethylene and ethylenically unsaturated mono- or dicarboxylic acids which have been neutralized by metal salts (see for example, British Pat. 1,011,981 and U.S. Pat. 3,264,272).

Sulfonic acid ionomers have been prepared by copolymerizing a styrene sulfonic acid salt with other monomers to form plastic polymers containing ionic crosslinks, see for example, U.S. Pat. 3,322,734, incorporated herein by reference.

Methods of sulfonating polymers are well known to the art. For example, aromatic containing polymers are sulfonated by a method described in U.S. Pat. 3,072,618, wherein a complex of a lower alkyl phosphate and $SO_3$ is used as the sulfonating agent. These sulfonated aromatic polymers have generally been sulfonated to a sufficient extent to be water-soluble in the form of their alkali metal salts. Other aromatic containing resins have been sulfonated, converted to their alkali metal salts and used as ion exchange resins. Water soluble polymers have been prepared by reacting aromatic rings in styrene-butyl rubber graft polymers with $SO_3$ to form a viscous sulfonation product, see for example, Soviet Pat. No. 211,079.

Attempts have been made to sulfonate unsaturated polymers. See for example, British Pat. 818,032 which teaches the sulfonation of butyl rubber with chlorosulfonic acid. The reaction product is a degraded low molecular weight viscous liquid.

Natural rubber has been sulfonated by complexing chlorosulfonic acid with ethers or esters and reacting the complex with the rubber in solution; see for example, German Pats. 582,565; 550,243 and 572,980, wherein water-soluble products were obtained by sulfonating the rubber and preparing salts of acid with alkalis, alkaline earths, heavy metals and organic bases. The highly sulfonated rubbers were found to be water-soluble per se.

Saturated polyolefins have similarly been sulfonated utilizing complexes of lower alkyl phosphorus compounds and $SO_3$; see for example, U.S. Pat. 3,205,285, which teaches that the dyeability of polypropylene may be improved by reacting polypropylene fibers with the $SO_3$ complex. The reaction of such treated fibers with alkali salts improves their dyeability.

SUMMARY OF INVENTION

It has surprisingly now been found that non-aromatic polymers having improved physical properties may be prepared by sulfonation with sulfur trioxide donors. In particular, olefinically unsaturated polymers are sulfonated by reacting said polymers with a complex of a sulfur trioxide donor and a Lewis base. The polymers so formed have improved properties such as higher melt strength. For example, butyl rubber which is notorious for its cold flow properties, when sulfonated by the process of this invention no longer exhibits the poor creep characteristics of unsulfonated butyl rubber.

The sulfonic acid containing polymers of this invention can be reacted with alkali metals, amines, amine derivatives, etc., to form sulfonic acid salts resulting in ionomeric crosslinking of the polymer.

DETAILED DESCRIPTION

This invention relates to sulfonated polymers and a method for preparing said products from polymers containing olefinic unsaturation. The term "olefinically unsaturated polymer" as used in the specification and claims means polymers both synthetic or natural having in said polymer structure sites of unsaturation whether in the backbone, pendant therefrom or cyclic, except that aromatic containing polymers are excluded from this description.

In particular, unsaturated polymers of this invention include low unsaturation polymers such as butyl rubber, EPDM and polyisobutylene, and high unsaturation polymers such as polybutadiene and polyisoprene. In addition to these elastomers, suitable sulfonic acid containing polymers may be prepared from plastic polymers prepared by the polymerization of ethylene or propylene with multiolefins such as hexadiene, dicyclopentadiene, norbornadiene, methylene norbornene, ethylidene norbornene, propylidene norbornene, 1,5-cyclooctadiene, etc. Preferably, these polymers have incorporated therein about 0.2 to about 10 mole percent unsaturation; more preferably about 0.5 to 6%; most preferably about 1 to about 4%, e.g. 2%. Illustrative of these polymers is a product containing about 90 mole percent ethylene, about 9 mole percent propylene, and about 1 mole percent of diene monomer.

Though the term "olefinic unsaturation" does not include aromatic unsaturation, the polymer backbone may contain aromatic rings either within the backbone structure or pendant therefrom. Sulfonation, however, is preferentially carried out at the site of olefinic unsaturation rather than on the aromatic ring.

The expression "butyl rubber" as employed in the specification and claims is intended to include copolymers made from a polymerization reacted mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin. Butyl rubber generally has a Staudinger molecular weight of about 20,000 to about 500,000, preferably about 25,000 to about 400,000, especially about 100,000 to about 400,000, and a Wijs Iodine No. of about 0.5 to 50, preferably 1 to 15. The preparation of butyl rubber is described in U.S. Pat. 2,356,128 which is incorporated herein by reference.

For the purposes of this invention, the butyl rubber may have incorporated therein from about 0.2 to 10% of combined multiolefin; preferably about 0.5 to about 6%; more preferably, about 1 to about 4%, e.g. 2%.

Illustrative of such a butyl rubber is Enjay Butyl 268 (Enjay Chemical Co.), having a viscosity average molecular weight of about 450,000, a mole percent unsaturation of about 1.5% and a Mooney viscosity of about 55 at 260° F.

Halogenated butyl rubber is commercially available and may be prepared by halogenating butyl rubber in a solution containing between 1 to 60% by weight of butyl rubber in a substantially inert $C_5-C_8$ hydrocarbon solvent such as pentane, hexane, heptane, etc., and contacting this butyl rubber cement with a halogen gas for a period of about 25 minutes, whereby halogenated butyl rubber and a hydrogen halide are formed, the copolymer containing up to one halogen atom per double bond in the copolymer. The preparation of halogenated butyl rubber is old in the art, see, e.g. U.S. 3,099,644 which is incorporated herein by reference. This invention is not intended to be limited in any way by the manner in which butyl rubber is halogenated, and both chlorinated and brominated butyl rubber are suitable for use in this invention.

Illustrative of halogenated butyl rubbers is Enjay Butyl HT-10-66 (a chlorinated butyl rubber containing about 1.3 wt. percent chlorine, having about 1.7 mole percent unsaturation and a viscosity average molecular weight of about 357,000).

Low molecular weight butyl rubbers, i.e. butyl rubbers having a viscosity average molecular weight of about 5,000 to 85,000 and a mole percent unsaturation of about 3 to about 4% may be sulfonated by the process of this invention. Preferably, these polymers have a viscosity average molecular weight of about 25,000 to about 60,000.

The term "EPDM" is used in the sense of its definition as found in ASTM-D-1418-64 and is intended to mean a terpolymer containing ethylene and propylene in the backbone and a diene in the side chain. Illustrative methods for producing these terpolymers are found in U.S. Pat. 3,280,082, British Pat. 1,030,289 and French Pat. 1,386,600, which are incorporated herein by reference. The preferred polymers contain about 45 to about 80 wt. percent ethylene and about 2 to about 10 wt. percent of a diene monomer, the balance of the polymer being propylene. Preferably, the polymer contains about 50 to about 60 wt. percent ethylene, e.g. 56 wt. percent, and about 2.6 to about 4.0 wt. percent diene monomer, e.g. 3.3 wt. percent. The diene monomer is preferably a nonconjugated diene.

Illustrative of these nonconjugated diene monomers which may be used in the terpolymer (EPDM) are hexadiene, dicyclopenadiene, ethylidene norbornene, methylene norbornene, propylidene norbornene, and methyl tetrahydroindene. A typical EPDM is Vistalon 3509 (Enjay Chemical Co.), a polymer having a Mooney viscosity at 212° F. of about 90 prepared from a monomer blend having an ethylene content of about 56 wt. percent and a nonconjugated diene content of about 2.6 wt. percent.

Polyisobutylene is a homopolymer which is produced using cationic polymerization methods. It is an example of a polymer containing only a small degree of unsaturation. The studies of F. S. Dainton and G. B. B. M. Sutherland (J. Polymer Sci., 4, 37 (1949)) have shown that the end unit of a polyisobutylene chain contains double bonded structures of unsaturation. An example is shown below.

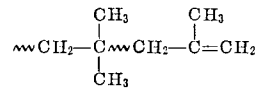

The unsaturation is thought to arise from the chain termination mechanism of the cationic polymerization. It has been now found surprisingly that polyisobutylene can be sulfonated to give soluble products within the framework of the present invention. The polyisobutylene may have a Staudinger molecular weight of about 50 to about 5,000,000, especially about 10,000 to about 2,000,000. The preparation of polyisobutylenes is well-known to the art.

The high unsaturation elastomers which are suitable for use in this invention include natural rubber, polybutadiene and polyisoprene. For the purposes of this invention, it is preferred that the high unsaturation polymer have a Mooney viscosity of about 20 to about 80 at 260° F. The molecular weight range is preferably between 25,000 and 500,000 as determined by the Staudinger molecular weight method; more preferably 40,000 to 400,000.

The term "low unsaturation elastomer" is intended to mean rubbers having the Iodine No. of 1 to about 50, preferably about 6 to about 25, more preferably about 4 to 15. The term "high unsaturated rubbers" is intended to mean polymers having an Iodine No. of about 51 to about 600, preferably 65 to about 600, more preferably 100 to about 450.

Examples of other high unsaturation rubbers which may be sulfonated by the method of this invention include natural rubber, isoprene-butadiene copolymers, isoprene-chloroprene copolymers, butadiene-chloroprene copolymers, polychloroprene and chloroprene copolymers.

Illustrative of another highly unsaturated polymer is a copolymer of isobutylene with a conjugated diolefin, see for example, U.S. Pat. 2,739,141 which is incorporated herein by reference.

In carrying out the present invention, an olefinically unsaturated polymer is sulfonated with a sulfonating agent comprising a sulfur trioxide donor in combination with a Lewis base containing oxygen, nitrogen or phosphorus. The Lewis base serves as a complexing agent for the sulfur trioxide donor.

The term "sulfur trioxide donor" as used in the specification and claims means a compound containing available sulfur trioxide. Illustrative of such sulfur trioxide donors are $SO_3$, chlorosulfonic acid, fluorosulfonic acid, sulfuric acid, oleum, etc. The term "complexing agent" as used in the specification and claims means the Lewis base suitable for use in the practice of this invention. A Lewis base is an electron pair donor.

In a preferred embodiment, the base and available sulfur trioxide are contacted prior to admixing them with the organic substance to form a complex. However, it is not essential to premix the available sulfur trioxide with the complexing agent, but rather it is only necessary to have the latter compound present during the sulfonating reaction. For instance, the available sulfur trioxide and complexing agent may be admixed simultaneously with the organic substance and the complex may be formed in situ in the sulfonating zone.

Because the complexing agent affects the reactivity of the available sulfur trioxide, the sulfonation temperature need not be maintained below 0° C., but rather it may vary from as low as $-100°$ C. to as high as 100° C. Moreover, the pressure is not a critical condition and may be adjusted to any satisfactory level. For instance, the sulfonation may be carried out from a reduced pressure of, say, about 0.5 atmosphere up to a superatmospheric pressure in the area of 10 atmospheres. The most suitable conditions from an economic standpoint are temperatures of 15° to 40° C. and pressures which are approximately atmospheric. The sulfonation time will, of course, vary with the particular conditions selected, the polymer being sulfonated, and the complex used. Generally, the reactions are complete within a few seconds to several hours after the reactants are contacted with each other. When sulfonating at approximately room temperature and atmospheric pressure, the contact time should be about 5 seconds to about 25 or 30 minutes. Since the complexing agent reduces the activity of the sulfur trioxide, it is not necessary to limit the sulfonating time as is required in conventional processes. This is also true of the purification step, where it may be desirable to leave the organic substance in contact with the sulfonating agent for several hours.

Illustrative of Lewis bases suitable for use as complexing agents are certain phosphorus compounds. While the phosphorus compound may be either inorganic or organic, it is preferred that the phosphorus compound be an organic compound having the general formula:

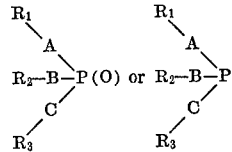

wherein A, B and C are independently selected from the group consisting of oxygen and —$CH_2$— and $R_1$, $R_2$ and $R_3$ are independently selected from the group consisting of $C_1$ to $C_{10}$ alkyl, aryl, alkaryl or aralkyl. Various organic phosphites, phosphinites, phosphinates, phosphates, phosphonates, phosphonites and phosphines may be used as the complexing agent.

Illustrative of phosphorous containing inorganic complexing agents are phosphoric acid, phosphorus acid, pyrophosphoric acid, metaphosphoric acid, phosphonic acid and phosphinic acid. In addition to the acids, their mono-, di- and tri-substituted derivatives may also be employed. Moreover, the preferred phosphorus compounds are the trialkyl phosphates and phosphites.

Illustrative of other organic phosphorus compounds suitable for use as complexing agents are: triethyl phosphate, trimethyl phosphate, tripropyl phosphate, tri-butyl phosphate, triethyl phosphite, trimethyl phosphite, tripropyl phosphite, tri-butyl phosphite, diethyl hydrogen phosphate, dimethyl hydrogen phosphate, diethyl hydrogen phosphite, dimethyl hydrogen phosphite, ethyl dihydrogen phosphate, methyl dihydrogen phosphate, ethyl dihydrogen phosphite, methyl dihydrogen phosphite, tris(2,4-dichlorophenyl) phosphate, tris(2,4-dichlorophenyl) phosphite, bis(2,4-dichlorophenyl) hydrogen phosphate, bis-(2,4-dichlorophenyl) hydrogen phosphite, tris(p-nitrophenyl) phosphate, tris(p-nitrophenyl) phosphite, bis(p-nitrophenyl) hydrogen phosphate, bis(p-nitrophenyl) hydrogen phosphite, tris(p-sulfophenyl) phosphate, tris(p-sulfophenyl) phosphite, 2,4-dichlorophenyl dihydrogen phosphate, 2,4-dichlorophenyl dihydrogen phosphite, ethyl metaphosphate, p-nitrophenyl metaphosphate, tris(beta-chloroethyl) phosphate, tris(2,4,6-trimethylphenyl) phosphate and tris(3,4,6-trimethyl-benzyl) phosphate.

Other organic compounds suitable for use as complexing agents include the organic pyrophosphates. These compounds have the general formula:

$$R_1R_2R_3R_4P_2O_7$$

wherein $R_1$, $R_2$, $R_3$ and $R_4$ are independently selected from the group consisting of H, $C_1$ to $C_{12}$ alkyl, aryl, aralkyl, alkaryl and mixtures thereof with the proviso that at least two R groups are not H. The R groups may be halogen-substituted. In the case of phenyl groups, the R group may be either halogen or nitro-substituted. As used in the specification and claims, the term "substituted derivatives thereof" when used in reference to these R groups means nitro or halogen-substituted R groups.

Illustrative of such organic pyrophosphates are tetraethyl pyrophosphate, tetramethyl pyrophosphate, dimethyl diethyl pyrophosphate, bis(2,4-dichlorophenyl) diethyl pyrophosphate, sim-p-nitrophenyl pyrophosphate, tetra-(beta-chloroethyl) pyrophosphate, diethyl dihydrogen pyrophosphate, and di(2,4-dichlorophenyl) dihydrogen pyrophosphate. Where pyrophosphates are employed, as many as 15 moles, more preferably about 12 moles of available sulfur trioxide may be complexed with each mole of phosphorus compound.

Other Lewis bases suitable as complexing agents are those Lewis bases which contain oxygen or nitrogen.

The nitrogen containing Lewis bases which form active complexes with sulfur trioxide donors and which are suitable for sulfonation of the unsaturated polymers of this invention have the general formulae:

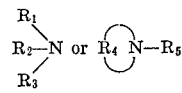

wherein $R_1$, $R_2$, $R_3$ and $R_5$ are independently selected from the group consisting of hydrogen, or $C_1$ to $C_{36}$ alkyl, aryl, alkaryl, aralkyl or mixtures thereof, with the proviso that where $R_1$ and $R_2$ are hydrogen, $R_3$ may not be hydrogen and $R_4$ is selected from the group consisting of $C_3$ to $C_{36}$ alkylene. Broadly speaking, the nitrogen containing Lewis base may be any primary, secondary or tertiary organic amine or a cyclic organic amine. Where the $R_1$, $R_2$, $R_3$, $R_4$ or $R_5$ radicals contain more than two carbon atoms, they may be heterogeneous organic radicals containing oxygen, chlorine, nitro groups or mixtures thereof. That is, $R_1$, $R_2$, $R_3$, $R_4$ and $R_5$ may be ethereal, contain substituted halogen atoms, nitro groups or comprise both ethereal and substituted groups. With reference to $R_1$, $R_2$, $R_3$, $R_4$ and $R_5$ of these formulae, the term "substituted analogues" as used in the specification and claims means R groups as described and substituted with the substituents referred to above. For the purpose of this invention, where $R_1$, $R_2$, $R_3$, $R_4$ and $R_5$ are ethereal, they shall be considered to fall in the class of "substituted analogues." In cases where $R_1$, $R_2$ and $R_3$ contain aryl, alkaryl or aralkyl groups, the use of excess sulfur trioxide donor is required to compensate for any sulfonation of the aromatic units.

Illustrative of these nitrogen containing Lewis bases are trimethylamine, triethylamine, dimethylaniline, diethylaniline, piperidine, morpholine, N-ethylmorpholine, diethylaminoacetal, and 2-chlorotriethylamine.

Other suitable complexing agents containing nitrogen may be represented by the formula:

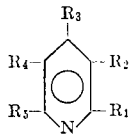

wherein $R_1$, $R_2$, $R_3$, $R_4$ and $R_5$ are hydrogen, halogen, or $C_1$ to $C_{36}$ alkyl, aryl, alkaryl or aralkyl. In cases where $R_1$, $R_2$, $R_3$, $R_4$ and $R_5$ contain aromatic units, the use of excess sulfur trioxide donor is required to compensate for any sulfonation of these units. The organic $R_1$, $R_2$, $R_3$, $R_4$ and $R_5$ radicals may contain halogen, oxygen atoms, or nitro groups. With reference to these R groups, the term "substituted analogues" as used in the specification and claims means R groups as described and substituted with oxygen or halogen or containing oxygen in the carbon chain. In addition, fused cyclic ring and polymeric structures are satisfactory.

Illustrative of this type of compound are pyridine, 2-methyl pyridine, 2,6-dimethyl pyridine, quinoline, quinaldine, poly-2-vinyl pyridine, poly-4-vinyl pyridine, 2-phenyl pyridine, 2-benzyl pyridine, 2,6-diphenyl pyridine, 2,6-dibenzyl pyridine, 3-nitropyridine, 4-chloropyridine and 2-bromopyridine.

The preferred nitrogen containing complexing agents are triethyl amine and tri-n-propylamine. The molar ratio of sulfur trioxide donor to nitrogen in the complex may be as high as 5 to 1, but the preferred ratio is 1 to 1.

Suitable solvents for the preparation of these complexes are chlorinated hydrocarbons. The preferred concentration of complex in solution is from 5 to 20% by weight, more preferably, 10 to 15%. The complexes may also be prepared by direct addition of the reagents if precautions are taken to dissipate the heat evolved. The reactions of complexes of $SO_3$ with molecules containing nitrogen and the unsaturation of polymer backbones have been found to be nonquantitative. Therefore, the use of excess complex is desirable in such reactions.

Oxygen containing Lewis bases have been found useful for complexing sulfur trioxide donor to facilitate reaction with the unsaturation of polymer molecules. The general formulae of such bases are:

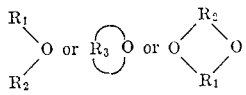

wherein $R_1$ and $R_2$ are independently selected from the group consisting of $C_2$-$C_{36}$ alkyl, aryl, alkaryl, or aralkyl and $R_3$ is $C_3$-$C_{36}$ alkylene; $R_3$ may be a substituted alkylene. The substituents may be $C_1$ to $C_{20}$ alkyl, aryl, alkaryl or aralkyl. For $R_1$, $R_2$ or $R_3$ greater than $C_2$, halogen, nitro groups and ethereal oxygen atoms may also be present. With reference to $R_1$, $R_2$ and $R_3$, the term "substituted analogues" as used in the specification and claims means $R_1$, $R_2$ and $R_3$ substituted as described above. The presence of aryl, alkaryl or aralkyl groups in the base demands the use of excess $SO_3$ since some of the $SO_3$ is used in sulfonation of the aromatic groups.

Illustrative of the oxygen containing Lewis bases suitable for use in the practice of this invention are tetrahydrofuran, para-dioxane, 2,3-dichloro-1,4-dioxane, meta-dioxane, 2,4-dimethyl-1,3-dioxane, 2-phenyl-1,3-dioxane, diethyl ether, trioxane and bis(2-dichloroethyl)-ether. The preferred oxygen containing bases are p-dioxane, tetrahydrofuran and bis-(2-dichloroethyl) ether.

Other oxygen containing Lewis bases suitable as complexing agents are esters having the general formula:

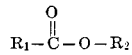

wherein $R_1$ and $R_2$ are $C_1$ to $C_{10}$ alkyl, phenyl or benzyl. Illustrative of such esters are benzyl acetate, butyl acetate, butyl propionate, methyl benzoate, hexyl acetate, isobutyl benzoate, ethyl-o-bromobenzoate, p-nitrophenyl acetate, ethyl-n-butyrate, ethyl stearate, and ethyl phenyl acetate.

The molar ratio of $SO_3$ donor to complexing agent may be as high as 15 to 1; preferably less than about 9:1, more preferably about 4:1 to about 1:1, e.g. 2:1.

The preferred solvents for preparation of the complexes of sulfur trioxide donor with complexing agents containing oxygen are chlorinated hydrocarbons or the oxygen containing complexing agent. Illustrative of such chlorinated solvents are carbon tetrachloride, dichloroethane, chloroform, and methylene chloride. The complexes may also be prepared by direct addition of reagents if precautions are taken to dissipate evolved heat.

The reactions of ethereal complexes of $SO_3$ with the unsaturation of polymer chains has been found to be nonquantitative. Therefore, the use of excess complex is desirable to give the required amount of sulfonation.

Any of the phosphorus, oxygen or nitrogen containing Lewis bases may be used individually as complexing agents or mixtures thereof may be used. The preferred complexing agents are the organic phosphorus compounds.

Where the phosphorus containing complexing agent is used, the complex may contain about 1 to 15, preferably about 1 to 9 moles of sulfur trioxide donor per mole of complexing agent, more preferably about 1 to 5 moles, e.g. 3 to 4 moles. Where the polymer is a low unsaturated polymer, the molar ratio of complex per mole of unsaturation in the polymer is about 0.05:1 to about 8:1, preferably about 0.1:1 to about 4:1, more preferably about 0.2:1 to about 3:1, e.g. 1:1. Where the polymer is a high unsaturated polymer, the molar ratio of complex per mole of unsaturation in the polymer is preferably less than 0.2:1.

The preferred complexing agents are trimethyl phosphite, triethyl phosphite, and trialkyl phosphates, more preferably triethyl phosphate. The preferred sulfur trioxide donor is $SO_3$.

It has been found that soluble sulfonated polymers may be prepared within the framework of the present invention. The level of sulfonation in the polymers of this invention may vary from about 0.08 mole percent to about 20 mole percent. At higher levels, the polymers are readily attacked by water. Excess swelling of the products occurs thereby limiting their suitability as elastomer or plastic materials. Preferably, the degree of sulfonation is about 0.08 to about 15 mole percent, more preferably about 0.1 to about 10 mole percent, most preferably about 0.2 to about 8 mole percent. Ideally, from the standpoint of fabricability and improved physical properties, the sulfonate level is about 0.25 to about 3 mole percent.

In the practice of this invention, the polymer to be sulfonated is dissolved in a suitable solvent and reacted with a complex comprising the complexing agent and the sulfur trioxide donor at moderate temperatures. The solvent medium must be a mutual one for the rubber and the complex. The solvent is preferably non-aromatic.

Illustrative of such solvents are alkanes, chlorinated alkanes, ethers, esters, or mixtures thereof. The alkane may be linear, branched or cyclic.

Illustrative of these alkanes are hexane, pentane, butane, cyclohexane, heptane and homologues thereof and analogues thereof. Illustrative of the chlorinated alkanes are methyl chloride, ethyl chloride, dichloroethane, chloroform, methylene chloride, carbon tetrachloride or any higher alkane or chlorinated alkane.

Illustrative of the suitable ethers and esters are tetrahydrofuran, p-dioxane, diethyl ether, amylethyl ether, bis-pentachloroethyl ether, bis-beta-chloroisopropyl ether, butyl acetate, isoamyl acetate and cyclohexyl acetate.

Preferably, the solids content of the polymer solution is less than 25 wt. percent. Higher solids content presents some handling problems due to high viscosities. Nevertheless, cements as high as 60 wt. percent solids can be employed if sufficient mixing power is available. More preferably the solids content is about 5 to about 20 wt. percent, most preferably about 10 to about 20 wt. percent.

The complex may be formed at about $-100°$ C. to about $+100°$ C., more preferably about $-40$ to $+40°$ C. Preferably, the complex is prepared immediately prior to use. In situ preparation of the complex in the polymer solution has also been found to be adequate. Where the complex is prepared prior to use, its concentration in solvent should be about 0.5 to about 25 wt. percent, more preferably about 1 to about 20 wt. percent, most preferably 10 to 20 wt. percent, e.g. 18 wt. percent.

Sulfonation of the polymer is conducted at a temperature between $-100$ and $+100°$ C. Sulfonation occurs when the complex in solution is added to the polymer solution. Though the complex is preferably dissolved in a suitable solvent, it may be added directly without solvent. The reaction time may be from 5 seconds to 3 hours. The product remains soluble throughout the reaction period. The product is most easily recovered by flashing off the solvents in hot water. The water also decomposes the unreacted complex. The product may also be recovered by evaporation.

The sulfonated polymers may be purified further, if necessary, by kneading in the presence of low boiling ketones or alcohols. The preferred materials for this purpose are acetone and methanol. After kneading, the polymers are dried on a hot mill or in a heated, vented extruder. The recovered products are soluble in a variety of solvents, which indicates that the sulfonation has been accomplished without crosslinking.

The sulfonic acid containing polymers have improved properties over those of the unsulfonated polymers. For example, pure gum butyl rubber is known to exhibit cold flow and have poor tensile strengths. On the other hand, the sulfonic acid containing butyl rubber exhibits reduced cold flow, has high tensile strength and modulus, lower elongation and high resistance to nonpolar solvents and reduced resistance to the polar solvents. The properties are attributed to hydrogen bonding of the sulfonic acid groups.

Where the polymer to be sulfonated is a high unsaturation polymer, the sulfonation level is preferably less than about 20 mole percent $SO_3H$ to avoid gelation; more preferably, the upper sulfonation level for these polymers is between about 0.5 to about 15 mole percent, most preferably about 2 to about 10 mole percent, i.e. about 3 to about 6 mole percent.

The amount of desirable sulfonation depends on the application. For uses in the rubber industry, it is desirable to have sulfonated polymers of high tensile strength and modulus which can nevertheless be processed at about 130° C. without resorting to machining. Another important factor in addition to sulfonation level which must be considered is the molecular weight. Higher molecular weight (or molecular size) polymers are more difficult to process because the act of processing must destroy the physical entanglements of the network. Higher molecular weight polymers have a greater number of physical entanglements. Therefore, the desirable sulfonation limit for processability will increase as the molecular weight of the polymer decreases. The preferred upper sulfonation level ($SO_3H$) for polymers having a number average molecular weight of about 250,000 is about 3 mole percent and for polymers having a number average molecular weight of about 50,000, the preferred upper limit is about 9 to 14 mole percent for good processability. These preferred limits, however, apply only where processability is a factor.

Polymers containing sulfonated unsaturation have been found to be somewhat deficient in thermal stability. It is generally quite difficult to remove from the polymers traces of water and acid left from the sulfonation. At elevated temperatures (300 to 350° F.) the aqueous acid catalyzes the decomposition of the polymers. Therefore, it is desirable to neutralize at least a portion of the acid as part of the manufacturing of the sulfonated polymers where the high temperature stability during processing is a product requirement. In the course of this neutralization, the sulfonic acid groups on the polymer are converted to the sulfonate salt moieties.

Various methods may be used to neutralize the acids. For example, a metal compound may be solubilized and added to a solution of polymer with good mixing. This neutralization reaction may be illustrated by the equation:

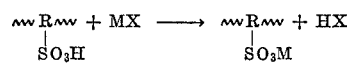

wherein $\sim R\sim$ represents the polymer backbone, MX represents the metal compound wherein M is a metal and X is preferably selected from the group consisting of hydroxyl, alkoxy or the counter ion of a weak acid such as carboxylic acids. Amine compounds may also be used to neutralize the acids. The neutralization of the sulfonic acid groups results in ionic bonding with the polymer, i.e. the neutralized polymer is an ionomer.

In preparing the ionomer it is not necessary to neutralize every sulfonic acid group. Preferably, at least 1% of the sulfonic acid groups are neutralized, through 100% of the acids may be neutralized if desired; more preferably about 2 to about 90% of the sulfonic acid groups are neutralized; most preferably about 50 to about 90% are neutralized.

The metal ions which are suitable in forming the ionic copolymers of the present invention may be classified into two groups: non-complexed metal ions and complexed metal ions. In the non-complexed metal ion, the valence of the ion corresponds to the valence of the metal. These metal ions are obtained from commonly known and used metal salts.

The complex metal ions are those in which the metal is bonded to more than one type of salt group and at least one of which is ionized and one of which is not. Since the formation of ionic polymers requires only one ionized valence, such complexed metal ions are equally well suited for use in the present invention. The utility of complexed metal ions employed in the formation of ionic copolymers corresponds in their ionized valences to those of the non-complexed ions. The monovalent metals are, of course, excluded, but the higher valent metals may be included depending upon how many metal ions are complexed and how many can be ionized. The preferred complex metal ions are those in which all but one of the metal valences are complexed and one is readily ionized. In particular, the mixed salts of very weak acids such as stearic acid and ionized acids such as formic and acetic acids may be utilized.

The non-complexed metal ions which are suitable in forming ionic copolymers in the present invention comprise mono, di, tri and tetravalent metals in Groups I, II, III, IV, V, VI-B, VII-B and VIII of the Perodic Table of the Elements. (See page B-3, Handbook of Chemistry and Physics, Chemical Rubber Publishing Co., 47th Ed.) Suitable monovalent metal ions are $Na^+$, $K^+$, $Li^+$, $Cs^+$, $Ag^+$, $Hg^+$, and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Fe^{+2}$, $Pb^{+2}$, $Co^{+2}$, $Ni^{+2}$, and $Zn^{+2}$. Suitable trivalent metal ions are $Al^{+3}$, $Cc^{+3}$, $Fe^{+3}$, and $Y^{+3}$. Suitable tetravalent metal ions are $Sn^{+4}$, $Zr^{+4}$, $Ti^{+4}$, and $Pb^{+4}$.

In addition to the metal ions, other basic materials such as primary, secondary and tertiary amines may be used to form the ionic bonds. The preferred amines are organic amines wherein the organic radicals are $C_1$ to $C_{30}$ alkyl, phenyl, aralkyl or alkaryl. More preferably, the organic radical is a phenyl, $C_1$ to $C_{10}$ alkyl, $C_7$ to $C_{10}$ alkylaryl or $C_7$ to $C_{10}$ aralkyl. Illustrative of such amines are anhydrous piperazine, triethylamine, tri-n-propylamine and tetraethylene-pentamine. The secondary and tertiary amines are more preferred especially piperazine and tri-n-propylamine.

The melt fabricability of sulfonic acid ionomers may be regulated by the degree of sulfonation, the molecular weight of the polymer, the nature of the polymer backbone, the nature of the counter ion and degree of neutralization of the acids. For example, for high molecular weight butyl rubber ($M_n=250,000$), the preferred upper limit on ionic content for monovalent ions such as $Na^+$, $K^+$, $Li^+$, and $Cs^+$ is about 1 mole percent $-CO_3M$, whereas for divalent ions such as $Zn^{+2}$, $Ca^{+2}$, $Cu^{+2}$, and $Ba^{+2}$ it is about 0.5 mole percent. For trivalent ions such as $Al^{+3}$, $Fe^{+3}$, and $Co^{+3}$, the ionic content is preferably less than 0.1 mole percent. The upper limit on desirable ionic content for elastomers is much less than that for plastics and semi-plastics since much lower temperatures are commonly used in melt fabrication. For example, elastomeric ionomers such as butyl rubber ionomers are preferably processable at 130° C., where as an ionomer of plastics such as isobutylene copolymer with styrene can be processed as high as 200° C.; see, for example, application Ser. No. 716,336, incorporated herein by reference.

The sulfonation polymers of this invention are readily cured by diisocyanates, diepoxides, and other reactive groups to give strong vulcanizates. Also, the ions of the monovalent ionomers in the sulfonated rubbers (especially the hydrogen form) may be ion exchanged for di- or trivalent metals in a curing process. For this purpose, a trivalent or divalent metal salts of a weak organic acid such as stearic acid, acetic acid, formic acid, or nonanic acid may be mixed into the polymer on a mill. Curing is promoted by raising the temperature to between 250° to 400° F.

Surprisingly, the sulfonated polymers of this invention may be cured in the same maner as the unsulfonated polymer. For example, sulfonated butyl rubber may be cured in the same manner, i.e. sulfur cure, as conventional butyl rubber. Hence, it is evident that the sulfonation technique of this invention does not destroy the double bond.

The advantages of the sulfonated polymers of this invention may be more readily appreciated by reference to the following examples.

Example 1

Ten grams of butyl rubber having a viscosity average molecular weight of 520,000 and an isoprene content of 1.93 mole percent as measured by the iodine number method was dissolved in 100 ml. of cyclohexane. The butyl rubber was sulfonated with an equimolar complex of triethyl phosphate and sulfur trioxide. The complex was formed by adding 0.45 milliliter of sulfur trioxide to 1.82 milliliters of triethylphosphate in 10 milliliters of dichloroethane at 25° C. The complex was in 3:1 mole excess to the number of moles of isoprene in the butyl rubber. The complex in solution was added to the butyl rubber solution at 25° C. A slight temperature rise of 1° C. was observed in the reaction medium. The product remained soluble in the reaction medium. After a 45 minute reaction, the rubber was precipitated in two liters of boiling water. Simultaneously with the precipitation the solvents were flashed off. The rubber was recovered and kneaded in acetone to remove the trapped water. The acetone was removed by milling the rubber at 250° F. The yield of dried rubber particles was 100% on the theoretical basis.

The sulfonated rubber contained $3.1 \times 10^{-4}$ equivalents of $SO_3H$ per gram as measured by acid base titration which corresponded to the observed sulfur content. About 1.74 mole percent of the monomer units in the original rubber were sulfonated; that is, essentially all of the available isoprene unsaturation (1.93 mole percent) was sulfonated.

Example 2

Sulfonated butyl rubbers containing various amounts of pendant $SO_3H$ groups were prepared using complexes of $(EtO)_3PO:(SO_3)_3$. The method was substantially the same as that given in Example 1. The complex was prepared in 26% by weight concentration in methylene chloride and contacted with a butyl rubber ($\overline{M}_v=520,000$ and 1.93 mole percent isoprene) in 17% by weight solution of hexane. The reaction times were 10 minutes. The various reagent quantities involved are given in Table I. The products were recovered after reaction by precipitation in boiling water and then dried on a rubber mill at 250° F. The sulfonic acid groups of the polymers were converted to ionic sulfonate groups by adding equivalent amounts of sodium stearate (see Table I) to the polymer while it banded on the rubber mill at 250° F. Not wishing to be bound by theory, it is believed that the reaction was as follows:

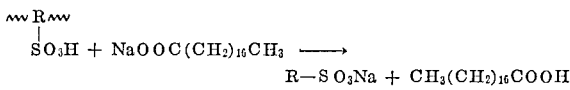

where $\sim R \sim$ represents the butyl backbone.

TABLE I.—PREPARATION OF SULFONATED BUTYL RUBBERS

| Sample number | Gm. butyl rubber | Ml. hexane | Mole isoprene available in solution | Mole $SO_3$ | Mole $(EtO)_3PO$ | Gm. $SO_3$ | Gm. $(EtO)_3PO$ | Ml. $CH_2Cl_2$ | Gm. sodium stearate | Experimental mole percent sulfonation |
|---|---|---|---|---|---|---|---|---|---|---|
| 1 | 1,065 | 8,000 | 0.365 | 0.0284 | 0.00946 | 2.27 | 1.73 | 15 | 8.7 | 0.15 |
| 2 | 1,065 | 8,000 | 0.365 | 0.0567 | 0.0189 | 4.54 | 3.45 | 30 | 17.4 | 0.30 |
| 3 | 1,065 | 8,000 | 0.365 | 0.075 | 0.0252 | 6.05 | 4.60 | 40 | 23.0 | 0.40 |
| 4 | 1,065 | 8,000 | 0.365 | 0.1133 | 0.0379 | 9.10 | 6.91 | 61 | 34.7 | 0.60 |

Example 3

The polymers of Example 2 were formed into films at 290° F. for 20 minutes under 15,000 p.s.i.g. of pressure. The tensile strength, moduli at 50% and 300% elongation, the elongation at break, and the permanent set at break were measured by stretching the materials in the jaws of an Instron Tester at a pull rate of 10″/minute. The results are shown in Table II. Samples 1–4 of Table II correspond to samples 1–4 of Table I of Example 2. Sample 5 is a sulfonated polymer which has not been neutralized while sample 6 is unsulfonated butyl rubber (Enjay Butyl 268).

It will be noted that the unneutralized sulfonated butyl rubber (sample 5 is far superior in green strength (uncured state) to conventional butyl rubber (sample 6). In fact, the properties of the unneutralized polymer having 1.74 mole percent $-SO_3H$ is very nearly equivalent to that of a sulfonated butyl polymer containing 0.15 mole percent $-SO_3Na$. Not wishing to be bound by theory, it is postulated that the improved properties of the unneutralized polymer are a result of hydrogen bonding. The sulfonated butyl rubber exhibits substantially improved cold flow properties in the unneutralized state.

It will be noted that as the $SO_3Na$ content of ionomer is increased, the physical properties of the ionomer are improved. Physical tests on these ionomers were made with the rubber in the unvulcanized state. Hence, any improvement in elastomer properties must be attributed to ionic bonding.

The effect of ionomer content on Mooney viscosity is shown in Table III.

TABLE II.—MECHANICAL PROPERTIES AS A FUNCTION OF SULFONATION LEVEL*

| Sample No. | Mole percent $SO_3M$ in butyl | Tensile strength, lb./in.$^2$ | Modulus, lb./in.$^2$ (50%) | Modulus lb./in.$^2$ (300%) | Percent Elongation | Set at break |
| --- | --- | --- | --- | --- | --- | --- |
| 1 | 0.15 $SO_3Na$ | 230 | 48 | 65 | 1,440 | 500 |
| 2 | 0.30 $SO_3Na$ | 353 | 44 | 61 | 1,200 | 100 |
| 3 | 0.40 $SO_3Na$ | 598 | 42 | 76 | 995 | 23 |
| 4 | 0.60 $SO_3Na$ | 1,817 | 63 | 184 | 940 | 13 |
| 5 | 1.74 $SO_3H$ | 230 | 44 | 77 | 1,000 | 80 |
| 6 | 0 $SO_3Na$ | 46 | 32 | 46 | 1,350 | 500 |

*10"/minute jaw speed of an Instron Tester.

TABLE III.—EFFECT OF SULFONATE LEVEL ON MOONEY VISCOSITY

| Sample No. | Mole percent $SO_3Na$ in butyl rubber | Mooney viscosity at 260° F. |
| --- | --- | --- |
| 1 | 0.15 | 63 |
| 2 | 0.30 | 65 |
| 3 | 0.40 | 70 |
| 4 | 0.60 | 80 |
| 5 | | |
| 6 | 0 | 50 |

It is evident that sulfonation increases the bulk viscosity of the butyl polymer near this typical processing temperature.

Table IV shows the effect of solvents on the hydrogen bonded (unneutralized) sulfonated polymer of Example I.

TABLE IV.—BEHAVIOR OF SULFONATED BUTYL 268 (1.74 MOLE PERCENT $SO_3H$) AND UNSULFONATED BUTYL 268 TOWARD SOLVENTS

| | Result | |
| --- | --- | --- |
| Solvent | Butyl rubber | Sulf. butyl rubber |
| Cyclohexane | Soluble | Swollen. |
| Toluene | do | Do. |
| 80/20 toluene/methanol | do | Soluble. |
| 50/50 cyclohexane/methyl ethyl ketone | do | Do. |
| Methanol | Swells slightly | Swollen. |
| Methyl ethyl ketone | do | Do. |

It is seen from Table IV that whereas butyl rubber is soluble in cyclohexane and toluene, these solvents merely swell the sulfonated butyl rubber (1.74 mole percent $SO_3H$). Butyl rubber itself swells in an 80/20 mixture of toluene and methanol or a 50/50 mixture of cyclohexane and methyl ethyl ketone. These solvents, however, solubilize the sulfonated material. Methyl ethyl ketone and methanol are non-solvents for either butyl rubber or the sulfonated-butyl rubber.

Example 4

The sulfonation experiment of Example 1 was repeated using chlorinated butyl rubber having a viscosity average molecular weight of $\overline{M}_v = 350,000$, an isoprene content of 1.93 mole percent and about 1.25 wt. percent chlorine. The reagent sulfonation quantities and the reaction conditions were the same as those of Example 1. After sulfonation, the polymer was found to contain about $2.0 \times 10^{-4}$ equivalents of $SO_3H$ per gram of polymer. The original unsulfonated material contained about 1.25 wt. percent of chlorine, while the sulfonated polymer contained about 0.87 wt. percent chlorine. The mechanical properties and behavior toward solvents of the sulfonated chlorobutyl product were essentially the same as those of the materials of Examples 1 and 2 with a corresponding sulfonation level.

Example 5

Experiments were performed to test complexes of sulfur trioxide ($SO_3$) with tetrahydrofuran (THF) for sulfonation efficiency. Solutions were prepared of the butyl rubber described in Example 1 in 200 ml. of hexane. The complexes of $SO_3$ with tetrahydrofuran (THF) were prepared in $CH_2Cl_2$ and reacted with a butyl solution (26.6 grams of rubber in 200 ml. hexane) at 25° C. for 10 minutes. The polymers were recovered as in Example 1. Three complexes were used in molar ratios of $SO_3$ to THF of 1/1, 2/1 and 3/1. The quantities used and the results of these experiments are given in Table V. No crosslinking occurred in the reaction.

TABLE V.—BUTYL RUBBER SULFONATIONS WITH THF:$(SO_3)_x$

| Run No. | Gm. butyl rubber | Hexane solvent (ml.) | Complex | Moles isoprene in butyl solution available | Mole $SO_3$ | Mole THF |
| --- | --- | --- | --- | --- | --- | --- |
| 1 | 26.6 | 200 | THF-$SOSO_3$ | $9.1 \times 10^{-3}$ | $9.1 \times 10^{-3}$ | $9. \times 110^{-}$ |
| 2 | 26.6 | 200 | THF-$(SO_3)_2$ | $9.1 \times 10^{-3}$ | $9.1 \times 10^{-3}$ | $4.55 \times 10^{-}$ |
| 3 | 26.6 | 200 | THF-$(SO_3)_3$ | $9.1 \times 10^{-3}$ | $9.1 \times 10^{-3}$ | $3.03 \times 10^{-}$ |

| Run No. | Gm. $SO_3$ | Gm. THF | Ml. $CH_2Cl_2$ complex solvent | Percent sulfur in polymer | Mole percent $SO_3H$ | I.V. $(CHCl_3)$* |
| --- | --- | --- | --- | --- | --- | --- |
| 1 | 0.728 | 0.656 | 2.0 | 0.18 | 0.32 | 1.379 |
| 2 | 0.728 | 0.328 | 2.0 | 0.16 | 0.28 | 1.657 |
| 3 | 0.728 | 0.218 | 2.0 | 0.37 | 0.65 | 1.137 |

*Intrinsic viscosity.

NOTE.—Theoretical mole percent sulfonation limit=1.93%.

It is quite apparent from Table V that all of the complexes of THF with $SO_3$ sulfonate the butyl rubber to some extent. It has been found that none of the reactions with the THF-$SO_3$ complexes are quantitative. The THF:$(SO_3)_3$ complex gave the highest degree of sulfonation.

Example 6

Sulfonation may be accomplished using other ethers as complexing agents for sulfur trioxide donors. For example, p-dioxane may be used as the complexing agent. Solutions of Enjay Butyl 268 were prepared in chloroform. The various experiments are described in Table VI. Complexes were prepared in chloroform with $SO_3$/p-dioxane ratios of 1/1 and 2/1 using the quantities shown in Table VI (experiments 1 and 2). The reaction conditions were similar to those used in Example 1 (10 minutes at 25° C.—recovery of product from boiling water and drying). The material was *not* chemically crosslinked at any stage of the reaction. Analyses for sulfonate level and intrinsic viscosity in $CHCl_3$ were conducted.

TABLE VI.—SULFONATIONS OF BUTYL RUBBER WITH p-DIOXANE-$SO_3$, $(ClCH_2CH_2)_2O$-$SO_3$, AND $(C_2H_5)_3N$-$SO_3$

| Run No. | Butyl rubber | $CHCl_3$ | Complex | Moles isoprene available in solution | Moles $SO_3$ | Mole complexing agent |
|---|---|---|---|---|---|---|
| 1 | 5.0 | 200 | ⬡O:$SO_3$ | $1.725 \times 10^{-3}$ | $1.725 \times 10^{-3}$ | $1.725 \times 10^{-3}$ |
| 2 | 5.0 | 200 | ⬡O:$(SO_3)_2$ | $1.725 \times 10^{-3}$ | $1.725 \times 10^{-3}$ | $8.63 \times 10^{-3}$ |
| 3 | 5.0 | 200 | $(ClCH_2CH_2)_2O$:$SO_3$ | $1.725 \times 10^{-3}$ | $1.725 \times 10^{-3}$ | $1.725 \times 10^{-3}$ |
| 4 | 5.0 | 200 | $(Et)_3N$:$SO_3$ | $1.725 \times 10^{-3}$ | $1.725 \times 10^{-3}$ | $1.725 \times 10^{-3}$ |

| Run No. | Gm. $SO_3$ | Gm. complexing agent | Ml. $CHCl_3$** | Percent sulfur in polymer | Mole percent $SO_3H$ | I.V. $CHCl_3$* |
|---|---|---|---|---|---|---|
| 1 | 0.138 | 0.152 | 2.0 | 0.29 | 0.51 | 1.90 |
| 2 | 0.138 | 0.076 | 2.0 | 0.45 | 0.79 | 1.64 |
| 3 | 0.138 | 0.247 | 3.0 | 0.04 | 0.07 | 1.42 |
| 4 | 0.138 | 0.175 | 3.0 | 0.09 | 0.18 | 1.87 |

*Intrinsic viscosity.
**$CHCl_3$ used for preparation of complex.

It can be seen from the data that neither complex of $SO_3$ with dioxane gave a quantitative reaction, however the 2/1 complex ratio gave a considerably higher sulfonation. The intrinsic viscosities of the products are similar to those prepared using $(EtO)_3PO$:$(SO_3)$ complexes at corresponding sulfonate levels. It was found that the mechanical properties of butyl polymers sulfonated with p-dioxane:$(SO_3)_x$ complexes were similar to those of butyl polymers sulfonated with $(EtO)_3PO$:$(SO_3)_x$ at corresponding sulfonate levels.

Example 7

The experiment of Example 6 was repeated except that $(ClCH_2CH_2)_2O$ was used to complex $SO_3$ for the butyl rubber sulfonation. The reaction conditions were the same as those of Example 6. The quantities used and the analytical results are repeated in Table VI ,experiment 3). No crosslinking in the reaction occurred. It was found that the product contained sulfonation.

Example 8

A complex of $SO_3$ with $(Et)_3N$ was used to sulfonate butyl rubber in the manner of Example 6. The data are shown in Table VI (Experiment 4). The amount of $SO_3$ was equivalent to that of the isoprene in butyl. The reaction was conducted in the usual manner and no crosslinking was indicated. However, sulfonation was observed in the product.

Example 9

Five gram quantities of butyl rubber were dissolved in $CH_2Cl_2$ at 25° C. The temperature was lowered to —25° C. and the polymer simultaneously formed a heavy slurry in the solvent. This heterophase system was sulfonated using complexes of $(EtO)_3PO$:$(SO_3)_3$, THF:$(SO_3)_3$ and dioxane:$(SO_3)_2$. The complexes were prepared in $CH_2Cl_2$ and were pre-chilled to —25° C. before addition to the polymer solutions. The experiments are described quantitatively in Table VII. Reactions of the complexes with the butyl slurries were conducted for 20 minutes at —25° C. The reaction products were neutralized by adding excess NaOH dissolved in methyl alcohol and stirring for 20 minutes at —25° C.

TABLE VII.—SULFONATIONS OF BUTYL RUBBER WITH REPRESENTATIVE COMPLEXES IN A SLURRY AT —25° C.

| Run No. | Gm. butyl | Ml. $CH_3Cl_2$ | Complex | Moles isoprene available | Mole $SO_3$ | Mole complexing agent | Gm. NaOH | Ml. $CH_3OH$ | Percent sulfur in polymer | Mole percent $SO_3Na$ |
|---|---|---|---|---|---|---|---|---|---|---|
| 1 | 5 | 200 | $(EtO)_3PO$:$(SO_3)_3$ | $1.73 \times 10^{-3}$ | $1.73 \times 10^{-3}$ | $5.76 \times 10^{-4}$ | 0.138 | 2.0 | 0.22 | 0.39 |
| 2 | 5 | 200 | THF:$(SO_3)_3$ | $1.73 \times 10^{-3}$ | $1.73 \times 10^{-3}$ | $5.76 \times 10^{-4}$ | 0.138 | 2.0 | 0.045 | 0.08 |
| 3 | 5 | 200 | Dioxane:$(SO_3)_2$ | $1.73 \times 10^{-3}$ | $1.73 \times 10^{-3}$ | $8.65 \times 10^{-4}$ | 0.138 | 2.0 | 0.09 | 0.16 |

*Prepared in 1 ml. $CH_2Cl_2$.

The products were recovered by pouring the slurry into boiling water, thereby flashing off the solvent. The sulfonated polymers were dried on a rubber mill at 270° F. Analyses showed that the polymers were sulfonated. The reactions were found not to be quantitative. The products of the slurry sulfonations were completely soluble in chloroform which showed that they contained no chemical crosslinks. Furthermore, the mechanical properties of the products were similar to those of materials prepared in homogeneous solution. Hence, it is shown that sulfonation need not be carried out in solution, but may be accomplished in a slurry of the polymer to be sulfonated.

Example 10

Polyisobutylene is an example of polymer containing only a small amount of unsaturation which is however capable of undergoing sulfonation as shown in this example.

Polyisobutylene was prepared by methods well known in the art. A 150 ml. solution of isobutylene in methyl chloride (3.17 moles/liter) was held at —45° C. To it was added $7.3 \times 10^{-5}$ moles of $AlCl_3$ catalyst in solution. The $AlCl_3$ solution was $1.62 \times 10^{-2}$ moles/liter concentration in $CH_3Cl$. The reaction mixture was quenched in methanol. The polymer was dried and the conversion was found to be 25%. The viscosity average molecular weight in toluene was found to be 95,000 and the number average molecular weight was found to be 50,000 by membrane osmometry.

Five gm. of the polyisobutylene was dissolved in 100 ml. of hexane and sulfonated with the $(EtO)_3PO:SO_3$ complex. The complex was prepared by adding 0.00895 mole (1.628 gm.) of $(EtO)_3PO$ to 10 ml. of dichloroethane followed by 0.00895 mole (0.715 gm.) of $SO_3$. The complex was reacted with the polyisobutylene in solution for 20 minutes at 25° C. No precipitation or gelation occurred. The molar ratio of complex to unsaturation in the polyisobutylene chain was theoretically 80/1. The large amount of unreacted complex was removed by precipitating the reaction mixture in boiling water; to insure purification, the polymer was doubly reprecipitated in boiling water from a 1% solution in hexane. The product was recovered and dried on a rubber mill at 260° F. Sulfur analyses of the product analyzed: percent S=0.07 percent or $2.19 \times 10^{-5}$ equivalents (e.q.) of $SO_3H$/gm. of polymer. This degree of sulfonation corresponds well with the available equivalents of unsaturation ($2.0 \times 10^{-5}$ e.q. unsat./gm.).

Example 11

Five gm. quantities of an ethylene-propylene terpolymer containing about 59.2% ethylene, and about 3.3% ethylidene norbornene (EPDM) were dissolved in 100 ml. quantities of hexane without purification and sulfonated by the 1/1 $(EtO)_3PO:SO_3$ complex at 25° C. for 20 minutes. The complex was prepared in 1,2-dichloroethane. The quantities are listed in Table VIII. No crosslinking or gelation occurred in the reaction. It was found that 60 to 75% of the $SO_3$ reacted with the polymer. The loss of some of the $SO_3$ in reaction was attributed to the presence of 0.2 part per 100 of santowhite crystals (4,4′-thio-bis (6-tert.-butyl-m-cresol)) stabilizer associated with the polymer. The sulfonated EPDM products were much stronger than the unsulfonated material. The tensile strength increased with increasing sulfonation (see Table IX).

TABLE IX.—PHYSICAL PROPERTIES OF SULFONATED ETHYLENE-PROPYLENE-TERPOLYMERS*

| Run No. (Table VIII) | Mole percent $SO_3H$ | Tensile (lb./in.²) at break | Modulus (lb./in.²) at 300% elongation | Percent elongation at break | Percent set at break |
|---|---|---|---|---|---|
| | 0 | 156 | 90 | 2750 | ~400 |
| 1 | 0.15 | 180 | 90 | 2700 | ~400 |
| 2 | 0.29 | 220 | 120 | 1500 | ~300 |
| 3 | 0.77 | 350 | 185 | 760 | 38 |

*Pull rate=10″/minute of an Instron tester.

Example 12

Polybutadiene is a polymer having a high degree of unsaturation. Polybutadiene may be sulfonated with complexes of $SO_3$ and $(EtO)_3PO$ to obtain non-crosslinked products.

A commercially available polybutadiene known as Firestone Diene (Firestone Co.) was analyzed by differential refractometry to contain 40% cis-1,4, 50% trans-1,4 and 10% vinyl butadiene structures of unsaturation and was purified by dissolving 50 gm. in 500 ml. of cyclohexane and precipitating the polymer in 10 liters of methanol. The polymer was dried on a hot (240° F.) rubber mill. The material was found to have a number average molecular weight of 120,000 (membrane osmometry). The polymer was sulfonated to varying degrees by dissolving 5 gm. quantities in very dilute solvent mixtures of cyclohexane and $CH_2Cl_2$. The quantities involved are listed in Table X. Sulfonation was effected using a complex of 3 moles of $SO_3$ per mole of $(TtO)_3PO$. The complexes were prepared in $CH_2Cl_2$. The experiments are described in Table X. Sulfonations were conducted by adding the complex solution dropwise with stirring to the polymer solution and reacting for 10 minutes at 25° C. Certain polymers were converted to ionic sulfonates of $\sim SO_3Na$ by adding a 2/1 molar excess of NaOH dissolved in methanol to the sulfonation reaction at 25° C. Neutralizations were carried out over a 15 minute period. The polymers were recovered by dripping the solution into boiling water. The solvents were flashed and the polymers precipitated. The products were dried at 130° C.

It was observed that completely soluble products were obtained up to 6.4 mole percent $SO_3H$ at which time a slight amount of gel was formed. Gelation became some-

TABLE VIII.—PREPARATION OF SULFONATED ETHYLENE-PROPYLENE TERPOLYMERS

| Run No. | EDPM | Theor. mole unsat. available in solution | Moles $SO_3$ | Moles $(EtO)_3PO$ | Gm. $SO_3$ | Gm. $(EtO)_3PO$ | Ml. $(CH_3)_2Cl_3$ | Mole percent S | Mole percent $SO_3H$ | Theor. mole percent $SO_3H$ |
|---|---|---|---|---|---|---|---|---|---|---|
| 1 | 5.0 | $1.58 \times 10^{-3}$ | $4.0 \times 10^{-4}$ | $4.0 \times 10^{-4}$ | 0.032 | 0.0728 | 1.0 | 0.15 | 0.15 | 0.26 |
| 2 | 5.0 | $1.58 \times 10^{-3}$ | $7.9 \times 10^{-4}$ | $7.9 \times 10^{-4}$ | 0.063 | 0.144 | 1.0 | 0.28 | 0.29 | 0.52 |
| 3 | 5.0 | $1.58 \times 10^{-3}$ | $1.58 \times 10^{-3}$ | $1.58 \times 10^{-3}$ | 0.126 | 0.288 | 1.0 | 0.74 | 0.74 | 1.04 |

TABLE X.—PREPARATION AND PROPERTIES OF SULFONATED POLYBUTADIENES

| Run | Gm. polybuta-diene | Ml. solvents | Moles unsaturation available in solution | Moles $SO_3$ used | Moles $(EtO)_3 \cdot PO$ used | Ml. $CH_2Cl_2$ | Gm. NaOH | Ml. $CH_3OH$ | Experimental Mole percent $SO_3H$ | Mole percent $SO_3Na$ | Condition of reaction |
|---|---|---|---|---|---|---|---|---|---|---|---|
| 1 | 5 | 100 ml. cyclohexane plus 40 ml. $CH_2Cl_2$. | 0.093 | 0.00047 | 0.00016 | 1.0 | 0 | 0 | 0.48 | 0 | Soluble. |
| 2 | 5 | do | 0.093 | 0.00047 | 0.00016 | 1.0 | 0.038 | 1.0 | 0 | 0.50 | Do. |
| 3 | 5 | 100 ml. cyclohexane plus 40 ml. $CH_3Cl_2$. | 0.093 | 0.00131 | 0.00048 | 1.0 | 0 | 0 | 1.38 | 0 | Do. |
| 4 | 5 | 100 ml. cyclohexane plus 40 ml. $CH_2Cl_2$. | 0.093 | 0.00131 | 0.00048 | 1.0 | 0.114 | 1.5 | 0 | 1.50 | Do. |
| 5 | 5 | do | 0.093 | 0.00262 | 0.00096 | 2.0 | 0 | 0 | 2.75 | 0 | Do. |
| 6 | 5 | do | 0.093 | 0.00262 | 0.00096 | 2.0 | 0.228 | 3.0 | 0 | 2.85 | Do. |
| 7 | 5 | do | 0.093 | 0.00650 | 0.0022 | 3.0 | 0 | 0 | 6.4 | 0 | Mostly soluble percent gel~⅕%. |
| 8 | 5 | 100 ml. cyclohexane plus 100 ml. $CH_2Cl_2$ | 0.093 | 0.0093 | 0.0031 | 5.0 | 0 | 0 | 9.4 | 0 | Mostly soluble percent gel~1%. |
| 9 | 5 | do | 0.093 | 0.013 | 0.00434 | 6.0 | 0 | 0 | 14.0 | 0 | Large amount of gel ~20% by weight. | what larger at 9.4 mole percent $SO_3H$ and very profuse at 14.0 mole percent $SO_2H$. It was concluded that the desirable upper limit for sulfonation of polybutadiene using the $(EtO)_3PO:(SO_3)_3$ complex was about 10 mole percent $SO_3H$.

Polybutadienes containing $SO_3H$ groups were found to process easily on a micro-rubber mill at 130° C. The product could be molded and remolded at 130° C. and 9000 p.s.i.g. retaining excellent thermoplasticity on each remolding. Such remoldability makes possible the reuse of scrap material.

Example 13

Polyisoprene rubber having a number average molecular weight of 200,000, as measured by membrane osmometry, was obtained and was purified in the manner of Example 12. Five gram quantities of the polymer were sulfonated using complexes of $(EtO)_3PO:(SO_3)_3$ (see Table XI). Neutralizations were conducted in the manner of Example 12.

Polyisoprenes containing pendent $SO_3H$ groups were found to process easily on a micro-mill at 130° C. at sulfonation levels of 8.5 mole percent $SO_3H$ and 2.9 mole percent $SO_3Na$. The products could be molded and remolded at 130° C. and 9000 p.s.i.g. indicating excellent thermoplasticity.

Example 15

Sulfonated butyl rubber was prepared and converted to the sodium salt in the manner of Example 2. The green strength of the sample was measured by stress relaxation studies.

A test sample was elongated to 100% of its original length and the time was measured for the stress to decay to 30% of its initial value. The time (in hours) is a measure of the green strength of the sample. The results for various levels of sulfonation in butyl are shown in Table XIII.

TABLE XIII

| Mole percent $SO_3Na$ | Green strength (hrs.) | Percent increase |
|---|---|---|
| Butyl 218 (control) | 0.250 | |
| 0.02 | 0.253 | 1 |
| 0.08 | 0.270 | 8 |
| 0.11 | 0.300 | 20 |
| 0.19 | 0.340 | 36 |
| 0.29 | 0.360 | 44 |
| 0.33 | 0.430 | 72 |
| 0.44 | 0.86 | 244 |
| 0.49 | 60.0 | 20,000 |
| 0.65 | 240.0 | 96,000 |

It is readily evident that with little as 0.08 mole percent $SO_3Na$ a significant improvement in green strength has

TABLE XI.—PREPARATION AND PROPERTIES OF SULFONATED POLYISOPRENES

| Run | Gm. polyisoprene | Ml. solvents | Moles unsaturation available in solution | Moles $SO_3$ used | Moles $(EtO)_3PO$ used | Ml. $CH_2Cl_2$ | Gm. NaOH | Ml. $CH_3OH$ | Experimental Mole percent $SO_3H$ | Experimental Mole percent $SO_3Na$ |
|---|---|---|---|---|---|---|---|---|---|---|
| 1 | 5 | 100 ml. cyclohexane plus 40 ml. $CH_2Cl_2$. | 0.0735 | 3.7×10 | 1.2×10 | 1.0 | 0 | 0 | 0.40 | 0 |
| 2 | 5 | do | 0.0735 | 3.7×10 | 1.2×10 | 1.0 | 0.0296 | 1.0 | 0 | 0.42 |
| 3 | 5 | do | 0.0735 | 0.0011 | 3.65×10⁻⁴ | 1.0 | 0 | 0 | 1.4 | 0 |
| 4 | 5 | do | 0.0735 | 0.0011 | 3.65×10⁻⁴ | 1.0 | 0.088 | 1.0 | 0 | 1.5 |
| 5 | 5 | do | 0.0735 | 0.0022 | 7.3×10⁻⁴ | 2.0 | 0 | 0 | 2.7 | 0 |
| 6 | 5 | do | 0.0735 | 0.0022 | 7.3×10⁻⁴ | 2.0 | 0.176 | 2.0 | 0 | 2.9 |
| 7 | 5 | do | 0.0735 | 0.0052 | 0.00172 | 4.0 | 0 | 0 | 6.2 | 0 |
| 8 | 5 | 100 ml. cyclohexane plus 100 ml. $CH_2Cl_2$. | 0.0735 | 0.00735 | 0.00245 | 6.0 | 0 | 0 | 8.5 | 0 |

Example 14

The sulfonated butyl rubber of Example 2, experiment 5, (i.e. 1.74 mole percent $SO_3H$) was compounded and cured in a conventional manner. The physical properties are shown in Table XII.

Similarly, the same polymer which had been converted to the sodium salt in the manner of Example 2 was compounded and cured. Physical properties of the polymer are shown in Table XII.

TABLE XII.—PHYSICAL PROPERTIES OF SULFUR CURED SULFONATED BUTYL RUBBER [1]

| | Tensile (p.s.i.) | Modulus (300%, p.s.i.) | Percent elongation |
|---|---|---|---|
| Polymer: | | | |
| A [2] | 2,200 | 400 | 650 |
| B [3] | 2,300 | 420 | 610 |

[1] See the following table:
[2] 1.74 mole percent $SO_3H$.
[3] 1.74 mole percent $SO_3Na$.

| Composition | Parts per 100 of rubber |
|---|---|
| Polymer | 100 |
| ZnO | 5 |
| Stearic acid | 1 |
| Sulfur | 2 |
| Tetramethylthiuram disulfide | 1 |

NOTE.—Samples cured at 310° F. for 40 minutes.

It is readily evident that sulfonated butyl rubber may be cured by acceleration of sulfur vulcanization in a conventional manner. The physical properties demonstrated for the vulcanizates are comparable to those of the unsulfonated rubber.

occurred. The 0.33 mole percent $SO_3Na$ level is found to be an especially critical level which results in drastic increases in green strength.

Example 16

Butyl rubber was sulfonated in the manner described in British Pat. 818,032. The teachings of Example 1 of that patent were repeated using 50 grams of the butyl rubber described in Example 1 and 5.0 grams of chlorosulfonic acid.

The product was found to be an oily degraded material having a sulfur content of about 0.80%, a chlorine content of about 0.25% and an intrinsic viscosity of 0.208 dl./gm. in chloroform.

It is evident that the method of British Pat. 818,032 is unsuitable for producing the sulfonated elastomers of this invention. Typical intrinsic viscosities of the sulfonated polymers of this invention are in excess of 1.0.

Example 17

The teachings of German Pat. 572,980 were used to chlorosulfonate natural rubber. Example 2 of that patent was repeated.

A mixture of 117 parts of chlorosulfonic acid and 180 parts of ether was added to a 10% solution of 70 parts masticated caoutchouc in chloroform. The product was found to be highly crosslinked (gelled) and highly swollen by water.

It is evident at the high levels of sulfonation taught by German Pat. 572,980 that it is not possible to prepare the uncrosslinked, water insoluble elastomers of this invention.

Example 18

The effect of ion crosslinking may be controlled through changes in the degree of neutralization of the sulfonic acid moiety incorporated in the polymer. For convenience, the degree of neutralization is termed the neutralization ratio, wherein the neutralization ratio is defined as follows:

Neutralization ratio
$$= \frac{\text{Equivalents of metal ion}}{\text{Equiv. } SO_3H + 3 \text{ (moles } (EtO)_3 PO/X)}$$

The amount of phosphate ester enters into the above equation since it hydrolizes at the high temperatures of drying, processing, and forming in the presence of residual water, acids, or bases according to the equation $$(EtO)_3PO \xrightarrow[H^+, \text{ or } OH^-]{3H_2O} H_3PO_4 + 3EtOH$$

In order to demonstrate the effect of neutralization ratio on the properties of the sulfonated butyl polymer, various samples were prepared having different neutralization ratios.

A butyl rubber having an isoprene content of 1.93 mole percent and a viscosity average molecular weight of 570,000 was sulfonated in the manner of Example 1 and neutralized in the manner of Example 2 using sodium hydroxide dissolved in methanol. After neutralization the polymers were stabilized with Ionol (2,6-di-t-butyl-4-methylphenol) and recovered in the manner of Example 2. The quantities involved in the preparations and other data are listed in Table XIV. A sample of unsulfonated butyl rubber (Run 1) is included for comparison.

TABLE XIV.—EFFECT OF THE DEGREE OF NEUTRALIZATION ON THE RHEOLOGY OF SULFONATED BUTYL

| Run No. | Gm. butyl rubber | Ml. hexane solution | Complex Moles $SO_3$ | Moles $(EtO)_3PO$ | Ml. $CH_2Cl_2$ | Neutralization Gm. NaOH | Ml. $CH_3OH$ |
|---|---|---|---|---|---|---|---|
| 1 | 1,042 | 10,000 | 0 | 0 | 0 | 0 | 0 |
| 2 | 1,042 | 10,000 | 0.1113 | 0.0371 | 60 | 5.342 | 29 |
| 3 | 1,042 | 10,000 | 0.1113 | 0.0371 | 60 | 6.235 | 34 |
| 4 | 1,042 | 10,000 | 0.1113 | 0.0371 | 60 | 7.120 | 38 |
| 5 | 1,042 | 10,000 | 0.1113 | 0.0371 | 60 | 8.010 | 43 |
| 6 | 1,042 | 10,000 | 0.1113 | 0.0371 | 60 | 8.900 | 48 |

| Run No. | Gm. ionol | Mole percent $SO_3M$ | Neut. ratio | Mooney visc.[1] 260° F., 0.2 r.p.m. | I.V. (0.25 gm./d.l. $CHCl_3$) |
|---|---|---|---|---|---|
| 1 | 1.25 | 0 | 0 | 27 | 2.053 |
| 2 | 1.25 | 0.60 | 0.60 | 32.9 | 2.038 |
| 3 | 1.25 | 0.60 | 0.70 | 42.1 | 2.131 |
| 4 | 1.25 | 0.60 | 0.89 | 74.8 | 2.125 |
| 5 | 1.25 | 0.60 | 0.90 | 67.5 | 1.880 |
| 6 | 1.25 | 0.60 | 1.00 | 61.0 | 1.900 |

[1] Five (5) minute warm-up and eight (8) minute reading with a large spindle.

It will be noted that the intrinsic viscosities of the unsulfonated butyl rubber and the sulfonated products are substantially the same, indicating that there was no appreciable degradation in molecular weight due to sulfonation. The mole percent sulfonation for all of the rubber samples tested was 0.60. The neutralization ratio was varied from 0.60 to 1.0.

The bulk viscosity as measured by the Mooney viscosity is found to increase with increase in neutralization number. Apparently, 0.8 is the critical neutralization ratio limit since at 0.8, the neutralization ratio is about 80% greater than that at 0.7, whereas the increase between 0.6 and 0.7 neutralization ratios is approximately 30%. Above this neutralization ratio of 0.8, there is a slight decrease in bulk viscosity.

Therefore, it is evident that by selecting the proper neutralization ratio a desired bulk viscosity may be obtained at a given sulfonation level. Where the counter ion is sodium, the preferred neutralization ratio at about 0.6 mole percent $SO_3M$ sulfonation level is about 0.7 to about 1.1, more preferably about 0.8 to 1.0.

The desired bulk viscosity, however, is best dictated by application. For inner tube fabrication where only a moderate increment of green strength is desirable, the neutralization ratio is about 0.6 to 0.7 at the 0.6 mole perecnt $SO_3M$ level of sulfonation.

Example 19

As is shown in this example, the rheology of the sulfonated polymer depends on the radius of the neutralizing ion. The butyl rubber described in Example 18 was sulfonated in the manner of Example 1 to a sulfonation level of 0.50 mole percent $SO_3H$ and stabilized with Ionol. Each of five different portions of the sulfonated polymer was neutralized to a neutralization ratio of 1.0 by a different ion.

This neutralization was carried out by dissolving the metal hydroxide or acetate in water and mixing the solution into a solution of sulfonated butyl rubber using a Waring blendor at high shear rates for 20 minutes. All the products thus formed were soluble in chloroform.

The bulk viscosities of the polymers were determined under the low shear conditions of a parallel plate plastometer using the method taught by Van Wazer et al. (See Viscosity and Flow Measurement, Interscience Publishers, J. R. Van Wazer et al., pages 292–295 (1963).) The data including salt quantities used are shown in Table XV.

TABLE XV.—EFFECT OF ION SIZE ON THE RHEOLOGY OF SULFONATED BUTYL

| Run number | Gm. butyl | Ml. hexane solution | Complex Moles $SO_3$ | Moles $(EtO)_3PO$ | Ml. $CH_2Cl_2$ | Neutralization Agent | Agent, gm. | Ml. $H_2O$ |
|---|---|---|---|---|---|---|---|---|
| 1 | 100 | 1,000 | | | | | | |
| 2 | 258 | 2,640 | 0.0228 | 0.00758 | 13 | | | |
| 2A | | 332 ml. of 2 | | | | $LiOH \cdot H_2O$ | 0.239 | 4.8 |
| 2B | | 332 ml. of 2 | | | | NaOH | 0.228 | 4.6 |
| 2C | | 322 ml. of 2 | | | | KOH | 0.320 | 6.4 |
| 2D | | 332 ml. of 2 | | | | $Ca(OH)_2$ | 0.211 | 8.4 |
| 2E | | 332 ml. of 2 | | | | $Ba(OH)_2 \cdot 8H_2O$ | 0.898 | 25.0 |
| 3 | 58.5 | 600 | 0.00518 | 0.00173 | 4 | | | |
| 3A | | 101 ml. of 3 | | | | $Pb(Ac)_2 \cdot 3H_2O$ | 0.658 | 13.2 |
| 3B | | 101 ml. of 3 | | | | $Co(Ac)_3$ | 0.409 | 8.1 |

| Run number | Gm. Ionol | Mole percent $SO_3M$ | Neut. ratio | I.V., 0.25 gm./d.l. ($CHCl_3$) | Ion[1] radius | $\eta$,[2] poise |
|---|---|---|---|---|---|---|
| 1 | 0.1 | 0 | 0 | 2.053 | | $3.2 \times 10^6$ |
| 2 | | 0.50 | 0 | | | |
| 2A | 0.032 | 0.50 | 1.0 | 1.533 | 0.68 | $4.56 \times 10^7$ |
| 2B | 0.032 | 0.50 | 1.0 | 2.413 | 0.97 | $4.80 \times 10^7$ |
| 2C | 0.032 | 0.50 | 1.0 | 2.034 | 1.33 | $1.46 \times 10^8$ |
| 2D | 0.032 | 0.50 | 1.0 | 1.792 | 0.99 | $4.85 \times 10^7$ |
| 2E | 0.032 | 0.50 | 1.0 | 1.557 | 1.34 | $1.50 \times 10^8$ |
| 3 | | 0.50 | 0 | | | |
| 3A | 0.01 | 0.50 | 1.0 | 2.188 | 1.20 | $4.6 \times 10^7$ |
| 3B | 0.01 | 0.50 | 1.0 | 2.030 | 0.63 | $5.0 \times 10^7$ |

[1] Handbook of Chemistry and Physics, Chem. Rubber Co., ed. by R. C. Weast, P.F—124 (1966).
[2] Parallel plate plastometer, 260° F.

It is readily apparent that all the ionomers have a much higher viscosity than the unsulfonated butyl rubber starting material. Furthermore, among the various ions, as the ion radius increased from about 0.63 to about 1.2 angstroms, little change occured in bulk viscosity irrespective of the valence and size of the ion. Above about 1.2 angstroms ion radius, much higher viscosities result, again irrespective of the balance. In particular, it is noted that the larger ions in the series, i.e., $K^+$ and $Ba^{+2}$, give the highest bulk viscosities, whereas polymers neutralized with divalent lead having an ion radius of 1.20 angstroms shows substantially the same bulk viscosity as polymers neutralized with monovalent lithium having a 0.68 ion radius.

Therefore, it is evident that ion size and not valence is the critical parameter in determining the bulk viscosity of a neutralized sulfonate ionomer. The critical ion radius is about 1.30. At an ion radius greater than 1.30 the bulk viscosity increases dramatically.

Example 20

The unsulfonated and sulfonated butyl rubbers of Example 1 were separately compounded with 70 parts of general purpose furnace black and 25 parts of a paraffinic petroleum oil known as Flexon 840 (ASTM Type oil 4). The recipe is that currently used in the inner tube industry for the manufacture of inner tubes using butyl rubber.

Molded strips of the two compounded rubbers were prepared by pressing at 240° F. under five tons of pressure. Freshly cut ends were pressed together in nearly perfect alignment to form a butt splice. The butt spliced rubbers were annealed at 200° F. for three minutes. The tensile strength of the splice and elongation of the bulk rubber to effect splice failure were measured at a pull rate of two inches per minute in an Instrom Tester. The results are shown in Table XVI.

TABLE XVI.—PROPERTIES OF UNCURED INNER TUBE COMPOUNDS

| Material | Tensile of splice, lb./in.² | Percent elongation |
|---|---|---|
| Butyl rubber | 10.1 | 37 |
| Sulfonated butyl rubber | 64.7 | 265 |

It is apparent that the sulfonated butyl rubber gives improved uncured splice properties. Additionally unlike the compounded unsulfonated butyl, it was not readily damaged and underwent no cold flow.

Example 21

It is well known that when inorganic fillers are compounded with polymers, these fillers do not contribute in any way to the strength of the compounded mixture since there is no interaction between the inorganic filler and the polymer. On the other hand, when polymers, especially elastomers, are compounded with carbon black, there is an interaction between the carbon black and the elastomer. Consequently, the filler contributes to the strength of the compounded mixture. This example demonstrates that sulfonated polymers may be reinforced using inorganic fillers.

Butyl rubber having an isoprene content of 1.93 mole percent and a viscosity average molecular weight of 520,000 was sulfonated in the manner of Example 1 to a sulfonate content of about 0.53 mole percent corresponding to about 0.30 wt. percent sulfur content. This polymer was compounded with the oxides shown in Table XVII.

TABLE XVII.—OXIDES BLENDED WITH THE SULFONATED BUTYL RUBBER

| Oxide | Parts/100 of rubber | Result |
|---|---|---|
| ZnO | 1 | Insoluble in $CHCl_3$. |
| ZnO | 3 | Do. |
| ZnO | 5 | Do. |
| ZnO | 10 | Do. |
| ZnO | 1 | Do. |
| ZnO | 3 | Do. |
| ZnO | 5 | Do. |
| ZnO | 3 | Do. |
| ZnO | 5 | Do. |

Although the original uncompounded sulfonated polymer was soluble in chloroform, the compounded polymer was not completely soluble.

B. The unsulfonated butyl rubber and the sulfonated butyl rubber of Part A of this example were compounded with the recipe shown in Table XVIII.

TABLE XVIII.—WHITE COMPOUNDS OF BUTYL AND SULFONATED BUTYL

| | Parts/weight polymer | |
|---|---|---|
| | Mix 1 | Mix 2 |
| Butyl rubber | 100 | 0 |
| Sulfonated butyl rubber | 0 | 100 |
| Hisil 215 (silicate) | 32 | 32 |
| Maglite K (MgO) | 25 | 25 |
| Titanox ($TiO_2$) | 40 | 40 |
| Similite 127 (wax) | 10 | 10 |
| Ultramarine Blue (coloring agent) | 0.2 | 0.2 |

Pads of the compounded materials were pressed out at 150° F. The pads were placed in cyclohexane. After one day the butyl rubber (Mix 1) had dissolved leaving behind the particulated filler. The sulfonated butyl compound (Mix 2) on the other hand merely swelled to 341% by volume. Similar experiments were performed using chloroform as the solvent. Again, the butyl rubber dissolved out of the compounded mixture while the sulfonated butyl mixture swelled. The results indicate a substantial degree of interaction of the sulfonates with inorganic fillers.

C. The compounded materials of Mix 1 and Mix 2 (Table XVIII) were further compounded with vulcanizing ingredients shown in Table XIX.

TABLE XIX

| | Parts/weight polymer | |
|---|---|---|
| | Mix 1 | Mix 2 |
| Vulcanization agents: | | |
| ZnO | 15 | 15 |
| S | 1 | 1 |
| Tuads | 0.66 | 0.66 |
| Tellurac | 0.82 | 0.82 |
| MBT (captax) | 0.76 | 0.76 |

Pads of these compounded materials were cured at 310° F. for 15 minutes at 9 tons pressure. The tensile properties are shown in Table XX.

TABLE XX.—TENSILE PROPERTIES

| Mix | Tensile, lb./in.² | Modulus (300%), lb./in.² | Percent elongation | Percent set at break |
|---|---|---|---|---|
| 1 Butyl | 2,195 | 445 | 725 | 60 |
| 2 Sulfonated butyl | 1,868 | 1,683 | 350 | 25 |
| 3 85 butyl, 15 hypalon | 1,910 | 1,105 | 510 | 45 |
| 4 85 sulfonated butyl, 15 hypalon | 1,834 | | 285 | 12 |

It is evident that a much greater reinforcement (higher modulus) occurs with the filled sulfonated polymer than with the filled unsulfonated polymer, while the failure (tensile) properties remain similar.

D. Butyl rubber and the sulfonated butyl rubber of Part A were blended with Hypalon 840 (85 parts butyl or sulfonated butyl plus 15 parts of Hypalon 840). The materials were mixed in the white compounds with the curing agents of Tables XVIII and XIX and vulcanized for 15 minutes at 310° F. under 9 tons of pressure. Tensile properties were determined and are listed in Table XX as runs 3 and 4. Again, greater reinforcement occurs with the sulfonated rubber as indicated by its ability to support greater strength at comparable elongation.

Example 22

The markedly increased bulk viscosity of sulfonated elastomers and the rheological behavior is thought to be the result of ionic interactions. The bonds act as physical cross-links and lead to an increase in the effective molecular weight of the rubber. For certain applications, such as hot melt adhesives, injection molding, and inner tube fabrication, it is desirable to retain the high bulk viscosity (green strength) of sulfonated rubbers at low temperatures while lowering the melt viscosity at high temperatures. This example demonstrates the "preferential plasticization of the ionic interactions at elevated temperatures only to the virtual exclusion of any effects of the backbone chain by the use of polar plasticizing agents.

The following example illustrates this plasticizing technique:

A sulfonated butyl was prepared in the manner of Example 1 to contain 1.50 mole percent $SO_3Na$. The initial rubber contained 1.93 mole percent isoprene and had a viscosity average molecular weight of 550,000. The dry product was compounded in separate experiments with 3 phr. of zinc stearate (M.P.=about 255° F.), calcium stearate (M.P.=about 356° F.), and zinc laurate (M.P.=about 210° F.). The unsulfonated butyl in similar compounds was included for control. The bulk Mooney viscosities were determined from 200° F. to 360° F., and the data are shown in Table XXI. It is apparent from the table that a dramatic drop occurs in the bulk viscosity of the sulfonated rubber at about the melt point of the polar agent. No such change in the bulk viscosity of compounds of the unsulfonated rubber was found (runs 5 to 8). It is thus shown that the ionic bonding can be virtually destroyed at elevated temperatures by polar agents which melt. The melt point of the ingredient can be used to control the viscosity-temperature transition. Such a transition was also found to occur in compounds of the sulfonated rubber and polar agent with carbon black and oil. The effect was found to be reversible in all cases so that, on cooling, the viscosity values were reproduced (see for example run 4* with the sulfonated rubber and run 8* with the unsulfonated rubber).

functional organic acid salts may also be utilized as plasticizers. These plasticizers may be broadly defined as compounds having a sufficient organic moiety to make them compatible with the polymer to be plasticized and a melting point at about the temperature at which the polymer is to be processed.

Other polar materials which may be used as a plasticizer, are low molecular weight materials, i.e. less than 10,000 molecular weight containing oxygen atom, phosphorus atoms or nitrogen atoms. Examples of those materials containing oxygen atoms are esters and ethers. The preferred esters are those which have aromatic or aliphatic units in them. Illustrative examples are dibutyl phthalate, dioctyl phthalate, dinonyl phthalate and higher esters of the formula

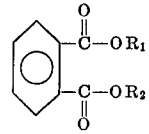

wherein $R_1$ and $R_2$ are aliphatic units of not more than 40 carbon atoms. Substituted esters with chlorine and bromine units can also be used.

Materials containing phosphorus have been found, surprisingly, to be good preferential plasticizers also. Illustrative of such materials are triethylphosphate, triphenylphosphate, triisobutyl phosphate, trimethylphosphite, triethylphosphite, triisobutylphosphite, triphenylphosphite, and various hydrogen phosphates are also useful. An important qualification on the phosphate is that it should not be highly acidic in nature, since highly acidic groups such as phosphoric acid moieties will catalyze desulfonation of the polymers.

Ether type materials also make excellent plasticizers because of the oxygen unit. It is desirable that the ether have a boiling point greater than 200° C. so that it will not vaporize in processing.

The exact nature of the plasticizer need not be specified. The only requirement is that the plasticizer contain polar units which are capable of interacting and randomizing hydrogen bonds and ionic bonds of the sulfonated rubbers and rubber ionomers. For specific applications, it is further desirable for the preferential plasticizer to have a melt point in the vicinity of a selected processing temperature.

Finally, the various agents specific for ionic interactions may be used alone or in combination with one another.

TABLE XXI.—PREFERENTIAL PLASTICIZATION OF IONIC BONDING BY POLAR AGENTS

| | Mooney (0.2 r.p.m.) | | | | | | | | |
|---|---|---|---|---|---|---|---|---|---|
| | Sulfonated butyl (1.5% SO₃Na) | | | | | Butyl | | | |
| Run No | 1 | 2 | 3 | 4 | 4* | 5 | 6 | 7 | 8 | 8* |
| | 0 phr., agent | 3 phr., calcium stearate | 3 phr., zinc laurate | 3 phr., zinc stearate | Run 4 on cooling | 0 phr., agent | 3 phr., calcium stearate | 3 phr., zinc laurate | 3 phr., zinc stearate | Run 8 on cooling |
| T., ° F.: | | | | | | | | | | |
| 200 | 165 | 166 | 150 | 166 | 167 | 39 | 37 | 37 | 38 | 39 |
| 220 | 163 | 164 | 138 | 162 | 164 | 35 | 33 | 33 | 32 | 31 |
| 240 | 162 | 162 | 123 | 151 | 160 | 32 | 31 | 30 | 32 | 33 |
| 260 | 160 | 159 | 102 | 115 | 120 | 27 | 26 | 25 | 24 | 25 |
| 280 | 160 | 159 | 77 | 75 | 79 | 24 | 22 | 23 | 22 | 23 |
| 300 | 159 | 156 | 64 | 59 | 58 | 20 | 18 | 19 | 18 | 18 |
| 320 | 158 | 140 | 52 | 42 | 45 | 16 | 14 | 14 | 14 | 15 |
| 340 | 157 | 140 | 45 | 15 | 20 | 13 | 13 | 12 | 12 | 13 |
| 360 | 155 | 77 | 40 | 12 | 12 | 9 | 10 | 9 | 8 | 3 |
| M.P.,° F., ingredient | 356 | 210 | 255 | 255 | | 356 | 210 | 255 | 255 | 255 |

Materials which will act as plasticizers of the type illustrated by this example have the general formula

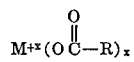

wherein M is a metal ion, $x$ is the valence of said metal ion and R is a $C_6$ to $C_{50}$ alkyl, phenyl, aralkyl or alkylaryl.

It will be obvious to those skilled in the art that di-

Example 23

It has been found that the ionic interaction in the ionomers of this invention can be substantially reduced using various plasticizing agents which release a small polar molecule such as water at an elevated temperature. Hydrated salts are examples of such agents which release water. In particular, $CaSO_4 \cdot 2H_2O$ is an ideal plasticizing agent in that at ordinary temperatures it does not act as a plasticizer but above 335° F. the calcium sulfate releases its two waters of hydration, thereby plasticizing the ionic groups of the sulfonated polymer.

A. A sulfonated butyl rubber was prepared in the manner of Example 1; 3 liters of butyl rubber cement containing 16.2 wt. percent solid was contacted with 27.2 ml. of a complex made by reacting 6.24 ml. of sulfur trioxide with 8.52 ml. of triethylphosphate in 135 ml. of methylene chloride. The reaction product was neutralized with 27.2 ml. of 0.2 normal NaOH in methyl alcohol.

B. The product produced in Part A of this example was blended with $CaSO_4 \cdot 2H_2O$ on a cool mill. Blend 2 was prepared by mixing 100 g. of the sulfonated butyl with 20 phr. of $CaSO_4 \cdot 2H_2O$ on a cool mill. Blend 3 was prepared by blending 100 g. of the sulfonated butyl with 40 phr. of calcium sulfate on a cool mill. The Mooney viscosity of the blended materials and the unblended sulfonated butyl rubber was determined at 260° F. and at 350° F. The data are shown in Table XXII.

TABLE XXII

| No. | Polymer | Ml. 5+8 min., 260° F., 0.2 r.p.m. | Ml. 30+8 min., 350° F., .2 r.p.m. |
|---|---|---|---|
| 1 | Sulfonated butyl | 66 | 40 |
| 2 | Sulfonated butyl +20 phr. of calcium sulfate. | 68 | 28 |
| 3 | Sulfonated butyl +40 phr. of calcium sulfate. | 75.2 | 28 |
| Cooled No. 1, 2 and 3 to room temperature and retested at 260°F. | | | |
| 1 | | 63 | |
| 2 | | 79* | |
| 3 | | 88* | |

While the conventional sulfonated butyl Mooney viscosity was reduced from 66 to 40 in going from 260° F. to 350° F., the sulfonated butyls containing calcium sulfate were reduced respectively from 68 to 28 and from 75.2 to 28. On retesting at 260° F. after cooling the product, the Mooney viscosity was substantially the same as that prior to testing. Therefore, it is evident that calcium sulfate may be used in its hydrated form as a plasticizing agent for sulfonated butyl ionomers.

Any hydrated salt may be used in a similar manner as a plasticizer provided that the dissociation temperature of the salt is about the same as the processing temperature of the polymer, i.e. about 200–500° F. Illustrative of such hydrated salts are $LiSO_3 \cdot H_2O$, $(NH_4)_2SO_4 \cdot Ce_2(SO_4)_3 \cdot 8H_2O$ $(NH_4)Cr(SO_4)_2 \cdot 12H_2O$ $(NH_4)Fe(SO_4)_2 \cdot 12H_2O$ $BaO_2 \cdot 8H_2O$, $BiO_2 \cdot 2H_2O$  $FeF_2 \cdot 8H_2O$ etc.

Example 24

A. About 1/10 mole (15.7 grams) of dimethyl dithiophosphoric acid is dissolved in 500 ml. of pentane. About 11 grams (about 0.11 mole) of triethyl amine dissolved in 50 ml. of pentane is added dropwise with rapid stirring. As the amine salt is formed, it precipitates from pentane solution. Upon completion of the reaction, the triethylamine-dimethyl dithiophosphoric acid salt is filtered and washed with pentane.

B. One hundred grams of a chlorinated butyl rubber having a viscosity average molecular weight of about 350,000, a mole percent unsaturation of 1.9% and a chlorine content of 1.25 wt. percent is dissolved in one liter of benzene. About 13 grams (0.05 mole) of the triethylamine-dimethyl dithiophosphoric acid is added to the benzene solution at room temperature and stirred for four hours. The phosphoric acid containing butyl rubber is precipitated from solution by the addition of methanol, washed with ether and vacuum dried.

The dried dialkyl dithiophosphoric acid containing polymer is redissolved in toluene and hydrolyzed by bubbling steam through the solution for two hours. The polymer is recovered and dried. The phosphorylated butyl rubber exhibits improved green strength. If desired, the ionomer may be prepared by neutralizing the acid with one of the aforementioned neutralizing metals or amines.

It will be obvious to one skilled in the art that many modifications and variations of this invention may be made without departing from the spirit thereof.

For example, a lower molecular weight butyl rubber, i.e. a butyl rubber having a molecular weight of about 10,000 to 85,000 may be sulfonated by the methods disclosed herein. These low molecular weight butyl rubbers are normally highly viscous liquids which can be cured with quinone dioximes. The sulfonated products have improved physical properties and may be either converted to ionomers or chemically crosslinked by reaction with diisocyanates, diepoxides, etc. These materials are useful mastics and potting compounds.

The sulfonated polymers of this invention may be blended with elastomers and plastics containing low or high amounts of unsaturation or no unsaturation at all. These elastomers and plastics may or may not contain polar groups. Furthermore, the sulfonated elastomers and plastics of this invention may also be blended with one another or with other sulfonated plastics.

The blends of the sulfonated elastomers of this invention with unsulfonated elastomer products generally fall into four classes. First, low unsaturation sulfonated elastomers may be blended with unsulfonated elastomers having low unsaturation, such as butyl rubber, EPDM, chlorobutyl rubber and mixtures thereof. These sulfonated low unsaturated polymers, e.g. sulfonated butyl rubber, may also be blended with "Hypalon," a chlorosulfonated polyethylene. These blends have improved rheological properties in the unvulcanized form and improved physical properties when covulcanized. Secondly, low unsaturation sulfonated elastomers may be blended with unsulfonated elastomers having high unsaturation, such as polyisoprene, polybutadiene, polychloroprene, natural rubber and styrene-butadiene rubber to provide tougher rheological composites. Thirdly, high unsaturation sulfonated elastomers may be blended with low unsaturation elastomers, such as butyl, chlorobutyl, and EPDM, to yield improved rheology. Finally, high unsaturation elastomers containing sulfonation may be blended with those high unsaturation rubbers not containing sulfonation. Again, the improved rheology of the sulfonated polymer is prevalent in the blend with the non-sulfonated material.

The sulfonated elastomers of this invention may be blended with plastics, whether or not these plastics contain unsaturation or polar groups. The elastomer provides a rubber phase in the composite resulting in improved impact strength of the blend. Illustrative of the sulfonated elastomers which may be used are sulfonated butyl rubber, sulfonated EPDM or mixtures thereof. Polypropylene, polyethylene, ethylene-propylene copolymers of low ethylene content (~0.2 to 8%), and polystyrene or mixtures thereof, are illustrative of the plastics.

Illustrative of the plastic polymers containing polar groups which may be blended wtih the sulfonated elastomers and plastics of this invention are sulfonated polystyrene, polyvinyl chloride, ethylene vinyl acetate copolymers, styrene methyl methacrylate copolymers, polymethyl methacrylate, polyacrylonitrile, butadiene-vinyl-pyridine copolymers, butadiene-methacrylic acid copolymers, nylon and polyethylene terephthalate. Surprisingly, the compatibility of the polymers in the blend is enhanced by the sulfonation of the olefinic containing polymer. For example, sulfonated polybutadiene blended with sulfonated polystyrene has improved compatibility compared to unsulfonated polybutadiene blended with polystyrene. The sulfonic acid or metallic sulfonate groups of the sulfonated polymer interact with the polar units of the plastics to improve physical strength while the overall composition shows improved impact strength over the original plastic material. Where the polymer with which the sulfonated polymer is blended contains basic groups such as amines, the acid-base pair may be used to form ionomers with or without additional metal ions for neutralization of the acid functionality.

Any conventional filler materials such as carbon black or inorganic fillers, such as calcium carbonate, MgO, ZnO, SiO$_2$, TiO$_2$, etc., may be blended wtih the sulfonated polymers of this invention. Surprisingly, it has been found that, while inorganic fillers do not ordinarily reinforce conventional elastomers, compositions of improved strength result when inorganic fillers are used to reinforce the sulfonated polymers of this invention. Thus, for example, a white side wall for tires may be made entirely from sulfonated butyl rubber reinforced with inorganic fillers. The resulting compositions have unusually high strength and are light in color.

The sulfonated polymers of this invention may be broadly described as natural or synthetic polymers having the general structure:

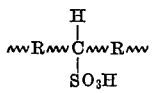

wherein R represents the polymer backbone. R may be saturated polymethylene organic groups or olefinically unsaturated organic groups. The organic groups may be substituted, i.e. halogenated, hydroxylated or contain amino, mercapto, nitro, cyano, carboxyl, or other functionality. The olefinically unsaturated groups can include unsaturation pendant from the backbone and cyclic non-aromatic unsaturation. The organic groups may have pendant therefrom aromatic rings or alternately aromatic rings may be incorporated into the organic group backbone. The aromatic rings may also contain functionality. The sulfonic acid moiety may be either in the allylic or vinylic position with respect to any olefinic unsaturation in the organic groups. The polymer preferably contains about 0.08 to about 20 mole percent—SO$_3$M; more preferably about 0.08 to about 15 mole percent; most preferably about 0.1 to about 10 mole percent, e.g. about 0.2 to about 8 mole percent. Ideally, from the standpoint of fabricability and improved physical properties, the sulfonic acid level is about 0.25 to about 6 mole percent.

The ionomer structure may be represented by the general structure:

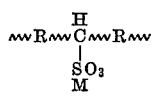

where R is described as above and M is an amine or a metal selected from the group consisting of metals in Groups I, II, III, IV, V, VI–B, VII–B, VIII and mixtures thereof of the Periodic Table of the Elements. It will be obvious to those skilled in the art that where M is a metal having a valence greater than 1, M will be associated with more than one —SO$_3$— group. These other —SO$_3$— groups may be in the same polymer chain or different polymer chains.

Though the polymers of this invention have been described in terms of their sulfonic acid derivatives, it will be obvious to those skilled in the art that the phosphoric acid derivatives of the polymers of this invention will have improved properties.

The phosphoric acid derivatives may be prepared in various ways. Preferably, the polymer is chlorinated and reacted with a diorgano dithiophosphoric acid or an organo thiophosphoric acid in the presence of an acid acceptor, e.g. a base. Preferably, the salt of a diorgano dithiophosphoric acid is prepared and reacted with the chlorinated polymer.

The salt may be prepared using any suitable base. Preferably, the base is sodium hydroxide, potassium hydroxide or an organoamine; more preferably the base is a tris-organoamine; most preferably the base is a trialkyl amine wherein the alkyl groups contain about 1 to about 6 carbon atoms.

Illustrative of such trialkyl amines are trimethyl amine, triethyl amine, tributyl amine and trihexyl amine. The salt may be reacted with the chlorinated polymer in a solution or milled with the dry polymer.

The acid salt replaces the chlorine on the polymer molecule, the acid being added via a sulfur-carbon bond. The reaction is illustrated as follows:

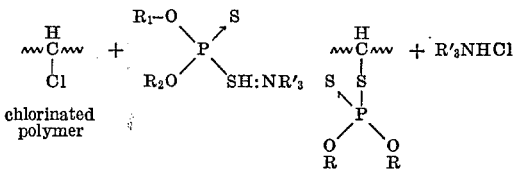

The dialkyl phosphoric acid is hydrolyzed to the acid form and if desired, neutralized to form ionomers.

Illustrative of the diorgano dithiophosphoric acids which may be used are diphenyl dithiophosphoric acid, dibutyl dithiophosphoric acid and dimethyl dithiophosphoric acid. The preferred acid is dimethyl dithiophosphoric acid since it is most readily hydrolyzed. Where the phosphoric acid is added merely to improve dyeability of the polymer, i.e. polypropylene, it is not necessary to hydrolyze the acid. Hence, in that case, a higher diorgano acid is preferred.

Since many modifications and variations of this invention may be made without departing from the spirit thereof, it is not intended to limit the scope thereof to the specific examples disclosed.

What is claimed is:

1. A vulcanizable sulfonated butyl rubber, consisting essentially of a butyl rubber having a sulfonic acid content of about 0.2 to about 8 mole percent.

2. A vulcanizable elastomeric ionomer composition prepared by neutralizing about 1 to about 100% of the sulfonic acid groups of the product of claim 1 to form their corresponding organic amine salt or the salt of a metal selected from the group consisting of metals in Groups I, II, III, IV, V, VI–B, VII–B, VIII and mixtures thereof of the Periodic Table of the Elements.

3. The product of claim 1 wherein the sulfonic acid content is about 0.25 to about 3 mole percent.

4. The composition of claim 2 wherein the metal is sodium, potassium, calcium, or barium.

5. A vulcanizable sulfonated EPDM, said polymer consisting essentially of an EPDM having a sulfonic acid content of about 0.2 to about 8 mole percent.

6. A vulcanizable elastomeric ionomer composition prepared by neutralizing about 1 to about 100% of the sulfonic acid groups of the product of claim 5 to form their corresponding organic amine salt or the salt of a metal selected from the group consisting of metals in Groups I, II, III, IV, V, VI–B, VII–B, VIII and mixtures thereof of the Periodic Table of the Elements.

7. The product of claim 5 wherein the sulfonic acid content is about 0.25 to about 3 mole percent.

8. The composition of claim 6 wherein the metal is sodium, potassium, calcium, or barium.

References Cited

UNITED STATES PATENTS

| | | | |
|---|---|---|---|
| 2,825,721 | 3/1953 | Hogan | 260—88.1 |
| 2,821,522 | 1/1958 | Bauman | 260—79.3 |
| 2,962,454 | 11/1960 | McRae | 260—2.2 |
| 3,033,834 | 5/1962 | Roth | 260—79.3 |
| 3,072,618 | 1/1963 | Turbak | 260—79.3 |
| 3,072,619 | 1/1963 | Turbak | 260—79.3 |
| 3,205,285 | 9/1965 | Turbak | 260—89.7 |

(Other references on following page)

UNITED STATES PATENTS

| | | | |
|---|---|---|---|
| 3,322,734 | 5/1967 | Rees | 260—79.3 |
| 3,328,367 | 6/1967 | Rees | 260—85.5 |
| 3,393,160 | 7/1968 | Corte | 260—2.2 |
| 3,423,375 | 1/1969 | Strand | 260—79.3 |
| 3,432,480 | 3/1969 | Stratton | 260—79.3 |

FOREIGN PATENTS

| | | | |
|---|---|---|---|
| 488,236 | 11/1952 | Canada | 260—79.3 |
| 572,980 | 3/1933 | Germany | 260—79.3 |
| 582,565 | 8/1933 | Germany | 260—79.3 |
| 818,032 | 8/1959 | Great Britain | 260—79.3 |
| 961,803 | 1/1963 | Great Britain | 260—79.3 |
| 1,092,645 | 5/1966 | Great Britain | 260—79.3 |

OTHER REFERENCES

Chem. Abst., 65, 13,920 g. (1966).
Piccolastic, Penn. Indust. Chem. Corp. Bulletin, p. 5 (1963).

JOSEPH L. SCHOFER, Primary Examiner

C. A. HENDERSON, Jr., Assistant Examiner

U.S. Cl. X.R.

260—23.7 M, 41.5 R, 41.5 A, 79.5 B, 79.5 A, 79.5 NV, 80 PS, 94.7 S, 762, 785, 793, 823, 888, 889, 890, 894 896, 897, DIG 31